(12) United States Patent
Sugawara

(10) Patent No.: US 9,397,882 B2
(45) Date of Patent: Jul. 19, 2016

(54) PACKET TRANSPORT NETWORK SYSTEM

(71) Applicant: FUJITSU LIMITED, Kawasaki-shi, Kanagawa (JP)

(72) Inventor: Eiji Sugawara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 14/224,448

(22) Filed: Mar. 25, 2014

(65) Prior Publication Data

US 2014/0321269 A1    Oct. 30, 2014

(30) Foreign Application Priority Data

Apr. 30, 2013 (JP) ................................. 2013-095828

(51) Int. Cl.
| | | |
|---|---|---|
| *H04L 12/24* | (2006.01) | |
| *H04L 12/761* | (2013.01) | |
| *H04L 12/723* | (2013.01) | |
| *H04L 12/707* | (2013.01) | |
| *H04L 12/18* | (2006.01) | |
| *H04L 12/703* | (2013.01) | |

(52) U.S. Cl.
CPC ............ *H04L 41/0654* (2013.01); *H04L 12/18* (2013.01); *H04L 41/0645* (2013.01); *H04L 41/0663* (2013.01); *H04L 41/0668* (2013.01); *H04L 45/16* (2013.01); *H04L 45/22* (2013.01); *H04L 45/24* (2013.01); *H04L 45/28* (2013.01); *H04L 45/50* (2013.01)

(58) Field of Classification Search
CPC ................ H04L 41/06–41/0695; H04L 45/16; H04L 45/22–45/28; H04L 45/50
See application file for complete search history.

(56) References Cited

U.S. PATENT DOCUMENTS

| | | | | |
|---|---|---|---|---|
| 7,345,991 | B1 * | 3/2008 | Shabtay | .............. H04L 12/2863 370/221 |
| 2008/0107027 | A1 * | 5/2008 | Allan | ...................... H04L 45/02 370/235 |
| 2008/0304407 | A1 * | 12/2008 | Umansky | .............. H04L 12/437 370/222 |
| 2009/0034413 | A1 * | 2/2009 | Sajassi | ................ H04L 12/1863 370/228 |
| 2009/0154346 | A1 * | 6/2009 | Sun | ..................... H04L 12/1863 370/228 |
| 2009/0252033 | A1 * | 10/2009 | Ramakrishnan | ........ H04L 12/18 370/228 |
| 2009/0303996 | A1 | 12/2009 | Takase et al. | |

(Continued)

FOREIGN PATENT DOCUMENTS

| | | |
|---|---|---|
| JP | 10-051493 | 2/1998 |
| JP | 10-190654 | 7/1998 |

(Continued)

*Primary Examiner* — Omer S Mian
(74) *Attorney, Agent, or Firm* — Staas & Halsey LLP

(57) ABSTRACT

A packet transport network system includes a first node to transmit a control packet through a secondary port, when the first node does not periodically receive, through a primary port, a continuity check packet transmitted on the first MLSP set in the first direction; and a second node, when the second node receives the control packet through a secondary port, to relay or terminate packets on the first and second active MLSPs, to receive, through the primary port, the multicast packet transmitted on the second MLSP set in the second direction, and to bridge the received multicast packet to a recovery path set in an interested link, the second node periodically receiving, through a primary port, the continuity check packet transmitted on the second MLSP set in the second direction, wherein the first node receives, through the second port, the multicast packet bridged to the recovery path.

7 Claims, 30 Drawing Sheets

(56) References Cited

U.S. PATENT DOCUMENTS

| | | | |
|---|---|---|---|
| 2011/0019534 A1* | 1/2011 | Ramakrishnan | H04L 45/00 370/217 |
| 2011/0194404 A1* | 8/2011 | Kluger | H04L 12/40189 370/218 |
| 2011/0228667 A1* | 9/2011 | Wang | H04L 12/437 370/216 |
| 2012/0044803 A1* | 2/2012 | Zhang | H04L 12/437 370/222 |
| 2012/0147893 A1* | 6/2012 | Shabtay | H04L 12/40189 370/395.53 |
| 2013/0021896 A1* | 1/2013 | Pu | H04L 12/1863 370/216 |
| 2013/0121142 A1* | 5/2013 | Bai | H04L 12/1868 370/228 |
| 2014/0056122 A1* | 2/2014 | Singal | H04L 45/28 370/220 |

FOREIGN PATENT DOCUMENTS

| | | |
|---|---|---|
| JP | 2001-345810 | 12/2001 |
| JP | 2009-296493 | 12/2001 |
| JP | 2008-28714 | 2/2008 |

* cited by examiner

FIG. 3
RELATED ART

| NODE | INPUT PORT | INPUT LABEL | OUTPUT PORT | OUTPUT LABEL |
|---|---|---|---|---|
| A | P1 | – | P2 | ab |
|   |   |   | P3 | ad |
| B | P1 | ab | P2 | bc |
| C | P1 | bc | P2 | – |
| D | P1 | ad | P3 | dg |
| G | P1 | dg | P2 | gh |
|   |   |   | P3 | – |
| H | P1 | gh | P2 | hi |
|   |   |   | P4 | – |
| I | P2 | hi | P3 | – |

FIG. 10

| NODE | ROUTING INFORMATION | | | | PATH TYPE INFORMATION | VALID REQUIREMENT FOR ROUTING INFORMATION | INVALID REQUIREMENT FOR ROUTING INFORMATION |
|---|---|---|---|---|---|---|---|
| | INPUT PORT | INPUT LABEL | OUTPUT PORT | OUTPUT LABEL | | | |
| A | P1 | – | P2 | ab | Primary | NORMAL STATE | NORMAL STATE |
| | P1 | – | P3 | ad | Primary | NORMAL STATE | NORMAL STATE |
| B | P1 | ab | P2 | bc | Primary | NORMAL STATE | NORMAL STATE |
| | P1 | ab | P3 | be | P_to_S | P_to_S=Y | P_to_S=N |
| C | P1 | bc | P2 | – | Primary | NORMAL STATE | NORMAL STATE |
| | P1 | bc | P3 | cf | P_to_S | P_to_S=Y | P_to_S=N |
| | P3 | cf | P2 | – | Secondary | Secondary=Y | Secondary=N |
| D | P1 | ad | P3 | dg | – | NORMAL STATE | NORMAL STATE |
| E | P3 | be | P4 | eh | – | NORMAL STATE | NORMAL STATE |
| | P4 | eh | P3 | be | – | NORMAL STATE | NORMAL STATE |
| F | P2 | cf | P3 | fi | – | NORMAL STATE | NORMAL STATE |
| | P3 | fi | P2 | cf | – | NORMAL STATE | NORMAL STATE |
| G | P1 | dg | P2 | gh | Primary | NORMAL STATE | NORMAL STATE |
| | P1 | dg | P3 | – | Primary | NORMAL STATE | NORMAL STATE |
| | P2 | gh | P3 | – | Secondary | Secondary=Y | Secondary=N |
| H | P1 | gh | P2 | hi | Primary | NORMAL STATE | NORMAL STATE |
| | P1 | gh | P4 | – | Primary | NORMAL STATE | NORMAL STATE |
| | P3 | eh | P2 | hi | Secondary | Secondary=Y | Secondary=N |
| | P3 | eh | P4 | – | Secondary | Secondary=Y | Secondary=N |
| | P3 | eh | P1 | gh | S_to_P | S_to_P=Y | S_to_P=N |
| I | P2 | hi | P3 | – | Primary | NORMAL STATE | NORMAL STATE |
| | P2 | hi | P1 | fi | P_to_S | P_to_S=Y | P_to_S=N |
| | P1 | fi | P3 | – | Secondary | Secondary=Y | Secondary=N |

FIG. 28

| NODE | ROUTING INFORMATION | | | | PATH TYPE INFORMATION | VALID REQUIREMENT FOR ROUTING INFORMATION | INVALID REQUIREMENT FOR ROUTING INFORMATION |
|---|---|---|---|---|---|---|---|
| | INPUT PORT | INPUT LABEL | OUTPUT PORT | OUTPUT LABEL | | | |
| A | P1 | — | P2 | ab | Primary | NORMAL STATE | NORMAL STATE |
| | P1 | — | P3 | ad | Primary | NORMAL STATE | NORMAL STATE |
| B | P1 | ab | P2 | bc | Primary | NORMAL STATE | NORMAL STATE |
| | P1 | ab | P3 | be | P_to_S | P_to_S=Y | P_to_S=N |
| C | P1 | bc | P2 | — | Primary | NORMAL STATE | NORMAL STATE |
| | P1 | bc | P3 | cf | P_to_S | P_to_S=Y | P_to_S=N |
| | P3 | cf | P2 | — | Secondary | Secondary=Y | Secondary=N |
| D | P1 | ad | P3 | dg | Primary | NORMAL STATE | NORMAL STATE |
| | P1 | ad | P2 | de | Primary | NORMAL STATE | NORMAL STATE |
| E | P1 | de | P2 | ef | Primary | NORMAL STATE | NORMAL STATE |
| | P1 | de | P3 | be | P_to_S | P_to_S=Y | P_to_S=N |
| | P3 | be | P4 | eh | P_to_T | P_to_T=Y | P_to_T=N |
| | P3 | be | P2 | ef | Secondary | Secondary=Y | Secondary=N |
| F | P1 | ef | P4 | — | Primary | NORMAL STATE | NORMAL STATE |
| | P1 | ef | P2 | cf | P_to_S | P_to_S=Y | P_to_S=N |
| | P1 | ef | P3 | fi | P_to_T | P_to_T=Y | P_to_T=N |
| | P2 | cf | P4 | — | Secondary | Secondary=Y | Secondary=N |
| G | P1 | dg | P2 | gh | Primary | NORMAL STATE | NORMAL STATE |
| | P2 | gh | P3 | — | Secondary | Secondary=Y | Secondary=N |
| H | P1 | gh | P2 | hi | Primary | NORMAL STATE | NORMAL STATE |
| | P1 | gh | P4 | — | Secondary | Secondary=Y | Secondary=N |
| | P3 | eh | P2 | hi | Secondary | Secondary=Y | Secondary=N |
| | P3 | eh | P4 | gh | S_to_P | S_to_P=Y | S_to_P=N |
| I | P2 | hi | P1 | — | Primary | NORMAL STATE | NORMAL STATE |
| | P1 | fi | P1 | fi | P_to_S | P_to_S=Y | P_to_S=N |
| | P1 | fi | P3 | — | Secondary | Secondary=Y | Secondary=N |

PACKET TRANSPORT NETWORK SYSTEM

CROSS-REFERENCE TO RELATED APPLICATION

This application is based upon and claims the benefit of priority of the prior Japanese Patent Application No. 2013-095828, filed on Apr. 30, 2013, the entire contents of which are incorporated herein by reference.

FIELD

The embodiments discussed herein are related to a packet transport network system.

BACKGROUND

In recent years, with the progress of the Ethernet (Registered Trademark) technology and Internet Protocol (IP) technology, IP integration of communication networks (hereinafter merely referred to as networks in some cases) has been rapidly progressed. This trend spreads to network providers. As a result, for each of carrier networks operated by communication carriers, the improvement of the efficiency of transmission has been promoted by changing a transmission technique from synchronous digital hierarchy (SDH) transmission to packet transmission in order to increase a demand for IP traffic and reduce power to be consumed and the cost of equipment and facilities.

The SDH transmission and the packet transmission are different in terms of the efficiencies of the transmission as follows. The SDH transmission is a time division multiplexing (TDM)-based technique and occupies time slots even when data to be transmitted does not exist. The packet transmission enables transmission for another communication service such as best-effort delivery when data to be transmitted does not exist. For the packet transmission, the efficiency of using lines is high.

For the carrier networks, even when the packet transmission is performed, rout management corresponding to the SDH transmission, or static path setting, is to be performed from the perspective of operational management. Specifically, the static path setting is to set a logical path (connection-oriented path) in which a connection is established in an IP network. In order to satisfy this request, a packet-based transport technique, which is called multi-protocol label switching-transport profile (MPLS-TP), has been developed.

Japanese Laid-open Patent Publication No. 2001-345810 and No. 10-190654 are examples of related art.

SUMMARY

According to an aspect of the invention, a packet transport network system configured to include a plurality of nodes to be connected to each other by a plurality of links so as to form a network, the packet transport network system includes: nodes configured to relay or terminate packets on first and second active multicast label switched paths (MLSPs) set in interested links, the nodes transferring packets to be branched in first and second directions from a starting node for a distribution of a multicast packet; a first node configured to transmit a control packet provided for a request for recovery through a secondary port, when the first node does not periodically receive, through a primary port, a continuity check packet provided for path monitoring and transmitted on the first MLSP set in the first direction; and a second node, when the second node receives the control packet through a secondary port, configured to relay or terminate packets on the first and second active MLSPs, configured to receive, through the primary port, the multicast packet transmitted on the second MLSP set in the second direction, and configured to bridge the received multicast packet to a recovery path set in an interested link, the second node periodically receiving, through a primary port, the continuity check packet transmitted on the second MLSP set in the second direction, wherein the first node receives, through the second port, the multicast packet bridged to the recovery path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a configuration of a label table of a related-art node;

FIG. 10 is a diagram illustrating a configuration of a label table of the node according to the embodiment;

FIG. 28 is a diagram illustrating a configuration of a label table of a node according to the other embodiment.

DESCRIPTION OF EMBODIMENTS

Figure 1:
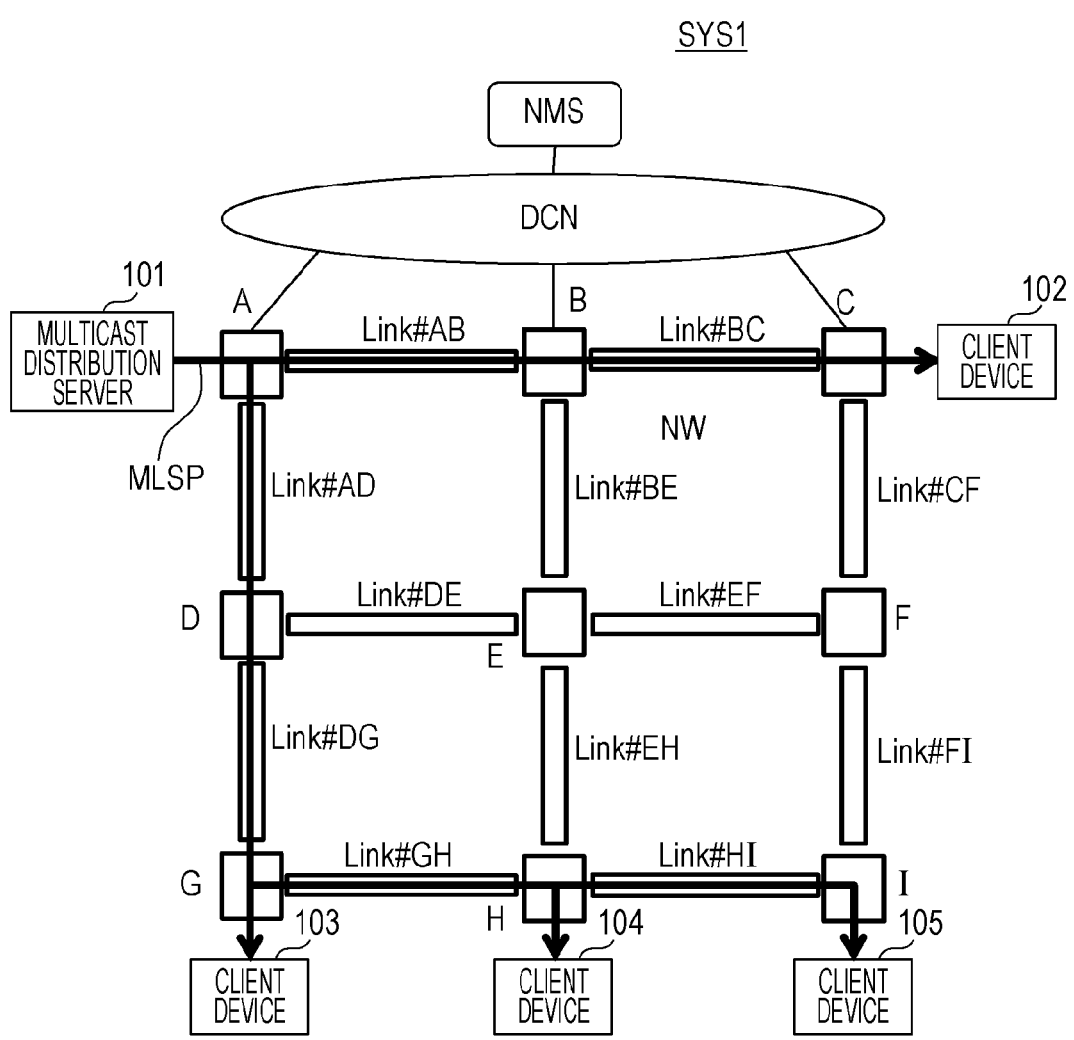
FIG. 1 is a block diagram illustrating a configuration of a related-art MPLS-TP network system.
Figure 2:
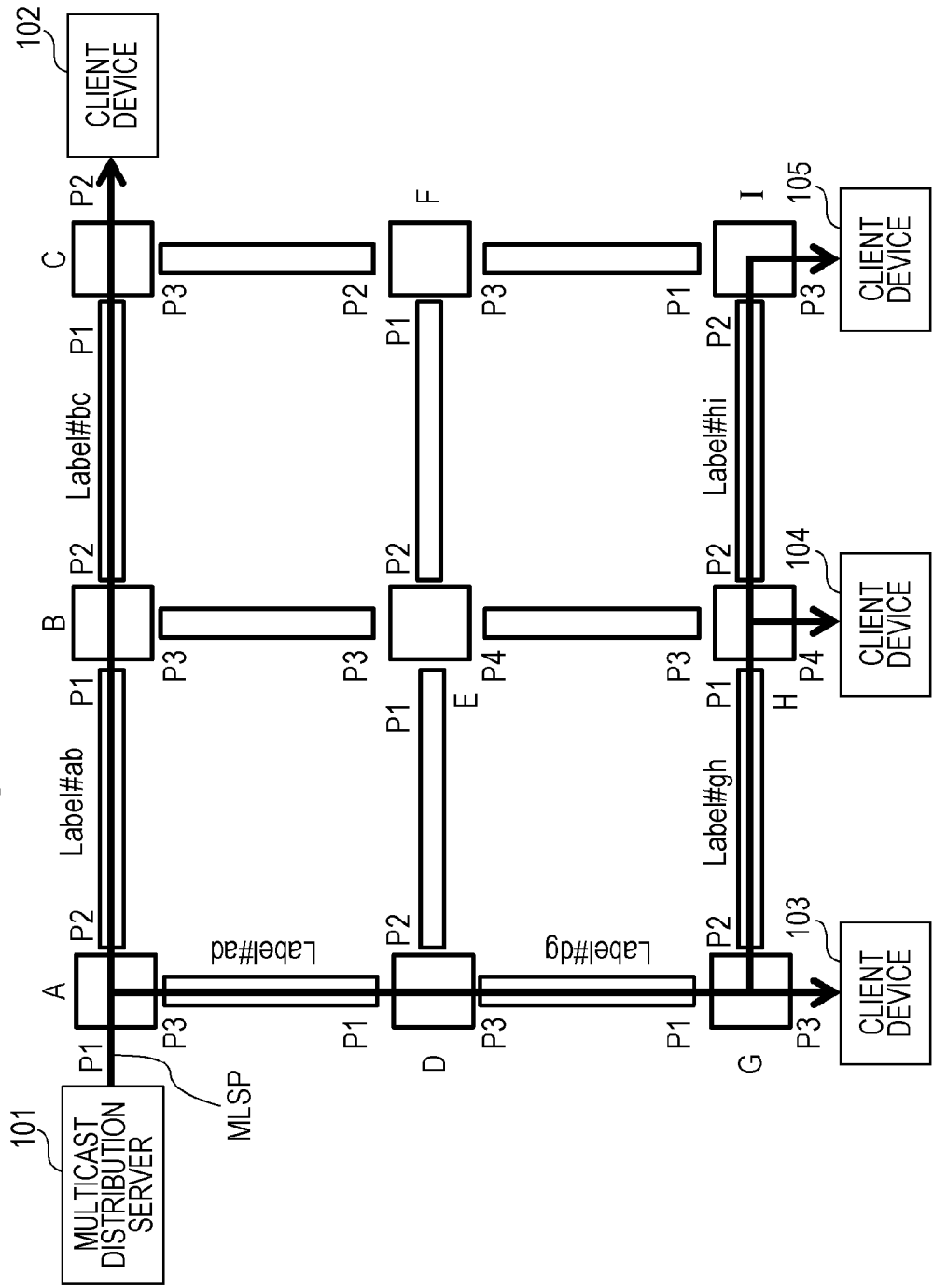
FIG. 2 is a block diagram illustrating the configuration of the related-art MPLS-TP network system.

Referring to FIGS. 1 and 2, an MPLS-TP network system SYS1 has a plurality of MPLS-TP node devices (hereinafter merely referred to as nodes in some cases) A to I that each have interface ports P1 to P3 or P1 to P4.

The nodes A to I are connected to each other in a mesh form by links Link#AB to Link#HI connecting interface ports P1 to P3 or P1 to P4 of each of the nodes A to I and thereby form a mesh network NW. The mesh network NW is an example of a packet transport network. The links Link#AB to Link#HI are lines that are each formed of at least one optical fiber.

MPLS-TP label switched paths (MPLS-TP LSPs) are set to the nodes A to I in advance in accordance with an instruction provided by a network management system (NMS) through a data communication network (DCN).

A multicast distribution server 101 is connected to a plurality of client devices (hereinafter merely referred to as clients in some cases) 102, 103, 104, and 105 by multicast label switched paths (hereinafter merely referred to as multicast paths in some cases) MLSP.

The nodes A to I each have a static label table (illustrated in FIG. 3) storing routing information and transfer a multicast packet in accordance with the routing information. For example, the node A sets a label (output label) ab to a multicast packet to be transferred to the node B from the interface port (output port) P2 of the node A and sets a label (output label) ad to a multicast packet to be transferred to the node D from the interface port (output port) P3 of the node A.

Figure 4:
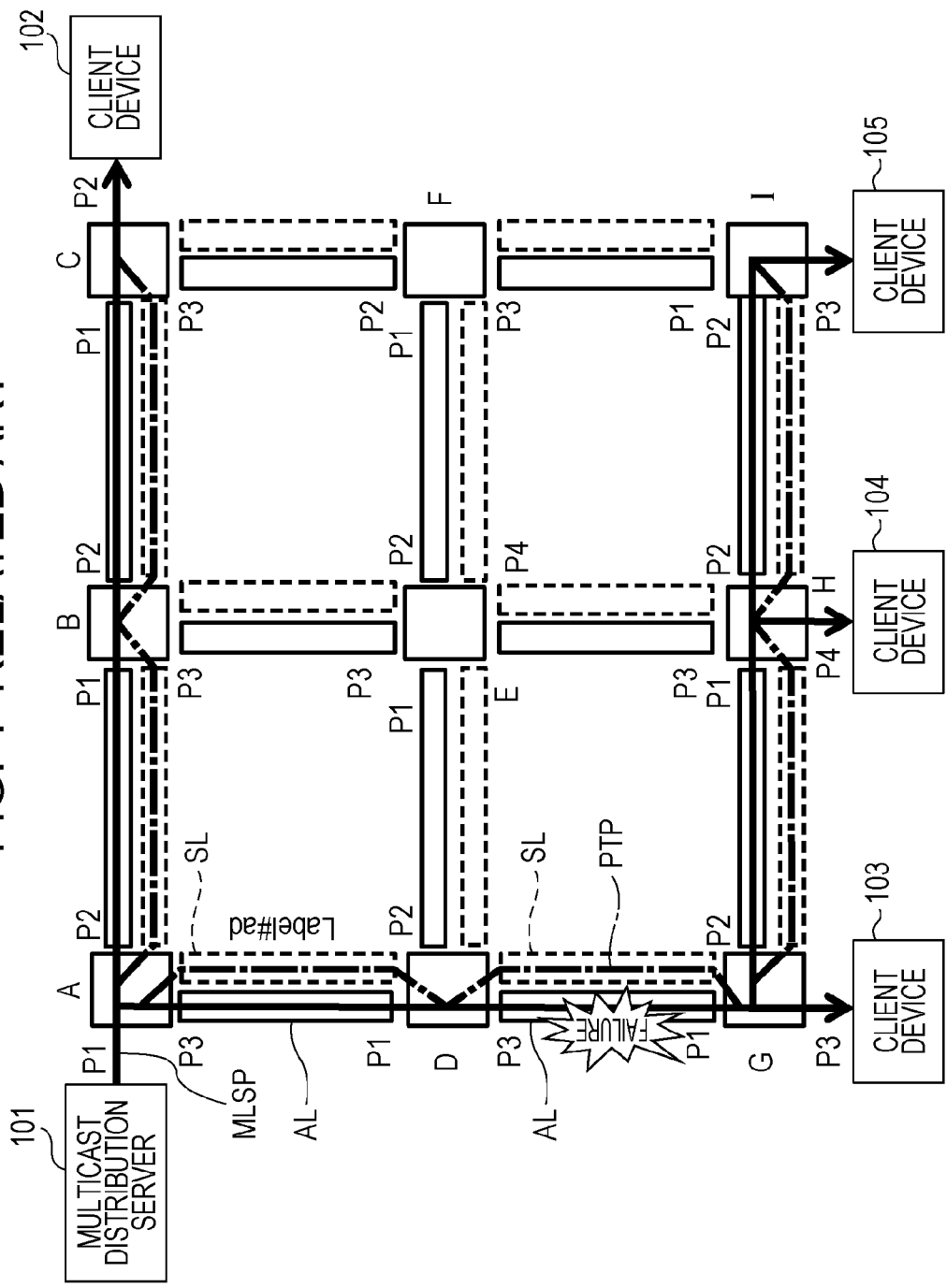
FIG. 4 is a diagram describing a method for recovering a failure within the related-art MPLS-TP network system.

For carrier networks, communication services have been requested to be highly available due to the nature of the carrier networks. Request for Comments 6372 (RFC6372) defines that a linear protection by an active link AL and a standby link (SL) is applied to a multicast path MLSP for each link, as illustrated in FIG. 4. RFC is a publication of the Internet Engineering Task Force (IETF) and the Internet Society (IS).

Thus, if a multicast path MLSP that uses an active link AL fails, the failure is recovered by a protection path PTP extending through a standby link SL. However, in this method for recovering the failure by the protection path PTP, a band that is twice as large as an actually used band is used.

As another method for recovering the failure, there is a ring protection technique as described in draft-umansky-mpls-tp-ring-protection-switching-03.txt of Networking Working Group of IETF.

Figure 5:
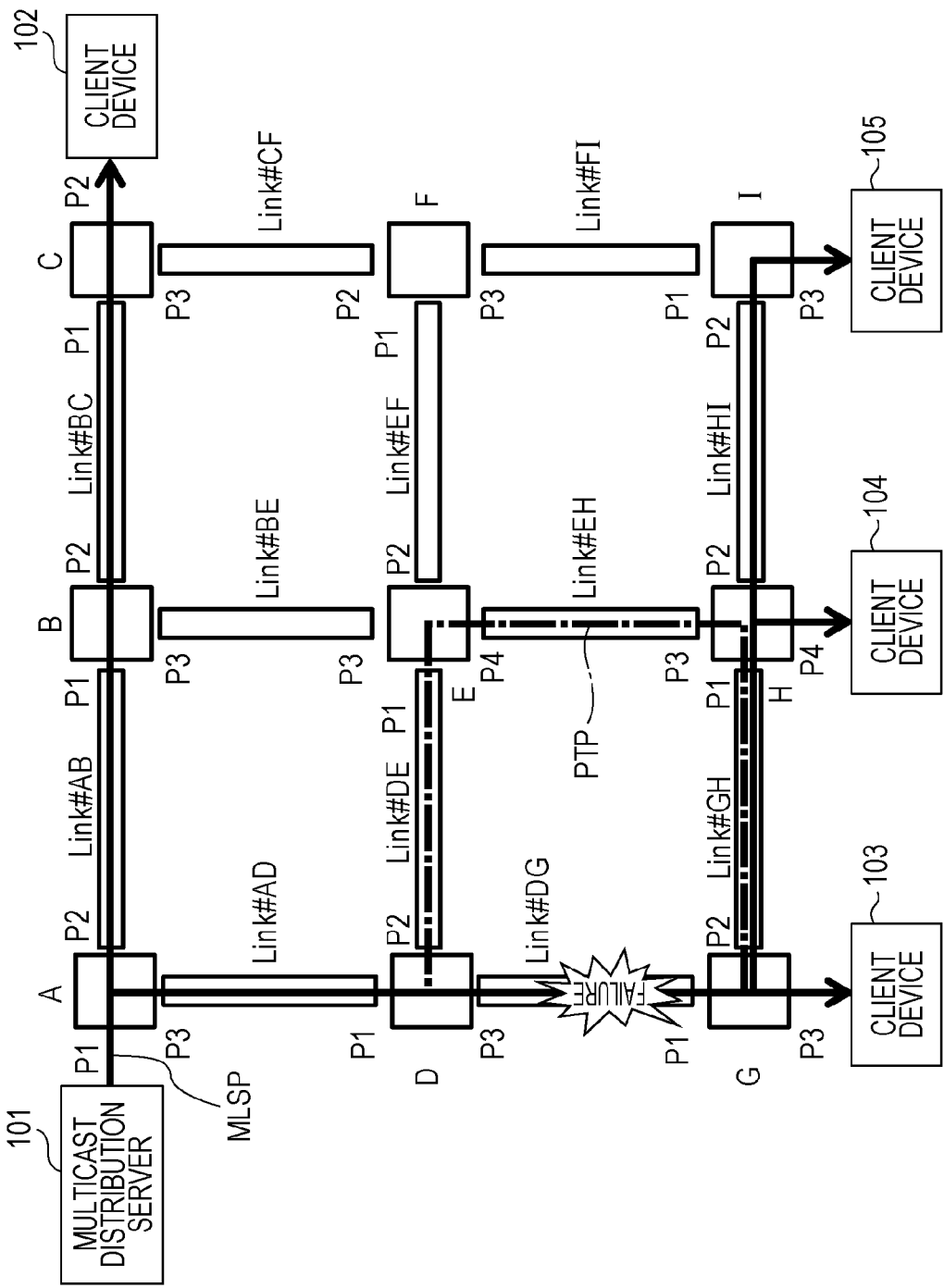
FIG. 5 is a diagram describing a method for recovering a failure within the related-art MPLS-TP network system.

As illustrated in FIG. 5, if the ring protection is applied, a failure of a multicast path MLSP that uses the link LINK#DG is recovered by a protection path PTP that is a detour extending through the links Link#DE, Link#EH, and Link#GH.

However, in this method for recovering the failure by the ring protection, the same packets of the multicast path MLSP and protection path PTP flow in the link Link#GH even in a normal state and wasteful use of a band is not avoided. In addition, in this failure recovery method, an increase in the number of path links used upon recovery from a failure is not avoided.

Hereinafter, embodiments are described in detail with reference to the accompanying other drawings. The drawings describe the embodiments. Techniques disclosed herein are not limited to the embodiments described in this specification and may be achieved in various other embodiments.

Embodiments

Outline of System

Figure 6:
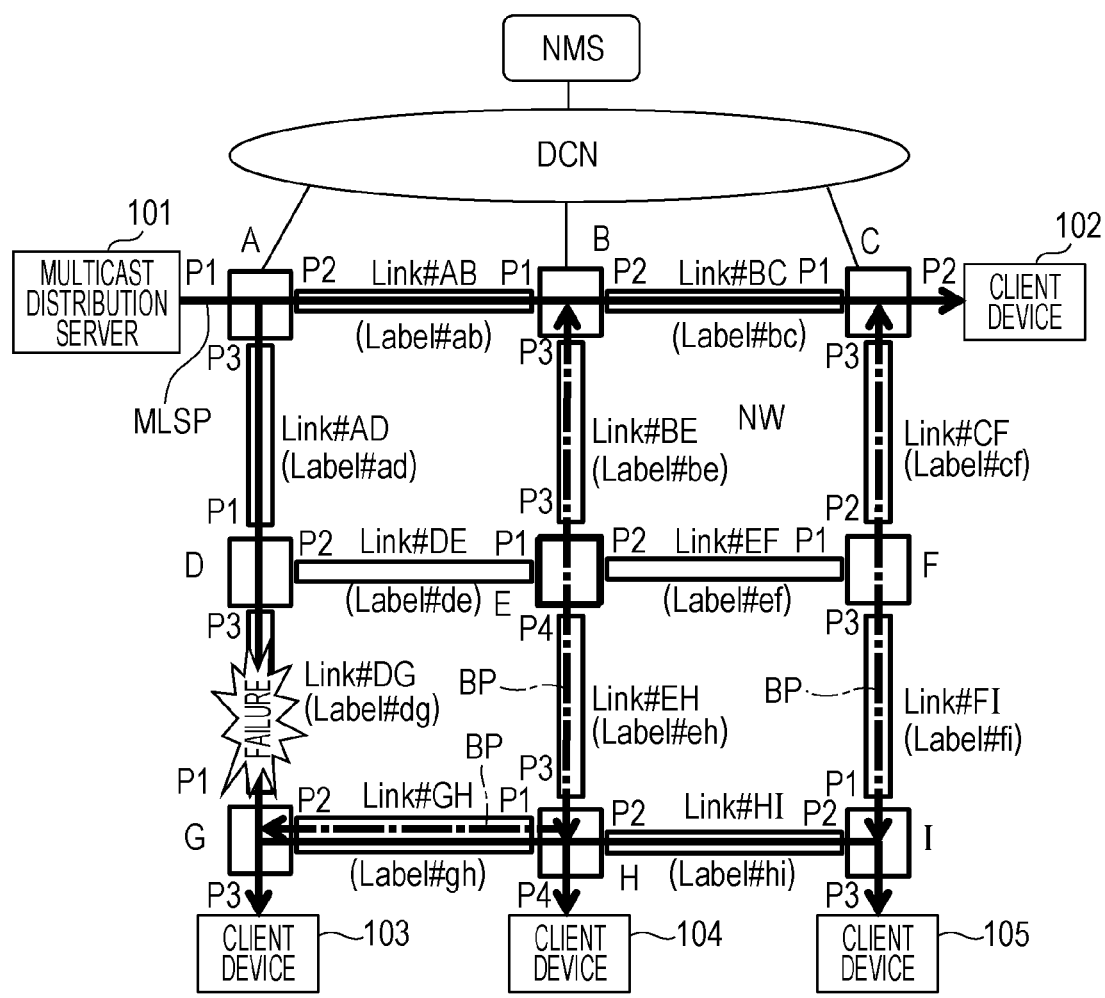
FIG. 6 is a block diagram illustrating an outline configuration of an MPLS-TP network system according to an embodiment.

Referring to FIG. 6 illustrating an outline configuration of an MPLS-TP network system according to an embodiment, the MPLS-TP network system SYS2 is a packet transport network system to which MPLS-TP that is a packet-based transport technique is applied. The MPLS-TP network system SYS2 has a plurality (9 in this example) of MPLS-TP node devices (hereinafter merely referred to as nodes in some cases) A to I that each have interface ports (physical ports) P1 to P3 or P1 to P4.

The nodes A to I are connected to each other in a mesh form by links (physical links) Link#AB to Link#HI connecting interface ports P1 to P3 or P1 to P4 of each of the nodes A to I and thereby form a mesh network NW. The mesh network NW is a packet transport network. The links Link#AB to Link#HI are lines that are each formed of at least one optical fiber.

The nodes A to I set MPLS-TP label switched paths (LSPs) in advance in accordance with an instruction provided by a network management system NMS through a data communication network DCN.

A multicast distribution server 101 is connected to a plurality (4 in this example) of client devices (hereinafter merely referred to as clients in some cases) 102, 103, 104, and 105 by active multicast label switched paths (hereinafter merely referred to as active multicast paths in some cases) MLSP in order to distribute desired content data. The active multicast paths MLSP are logical paths (connection-oriented paths) in which connections are established in the mesh network NW.

The nodes A to I each have a label table storing routing information (described later) and the like and transfer a multicast packet in accordance with the routing information. For example, the node A sets a label (output label) ab to a multicast packet to be transferred to the node B from the interface port (output port) P2 of the node A and sets a label (output label) ad to a multicast packet to be transferred to the node D from the interface port (output port) P3 of the node A (refer to FIG. 10).

As illustrated in FIG. 6, in the MPLS-TP network system SYS2, if an active multicast path MLSP set in a first direction fails, the failure is recovered using a logical branched path (hereinafter merely referred to as recovery branched path or recovery path) BP provided for failure recovery and related to an neighboring node (for example, node B) having an active multicast path MLSP set in a second direction in the same manner as a node (for example, node G) for handling a failure. The recovery branched path BP is a connection-oriented path, like the active multicast paths MLSP.

Although the embodiment describes a failure of an active multicast path MLSP and a failure of a link (for example, Link#DG) in context, the failures are not significantly different.

Details of System

Figure 7:
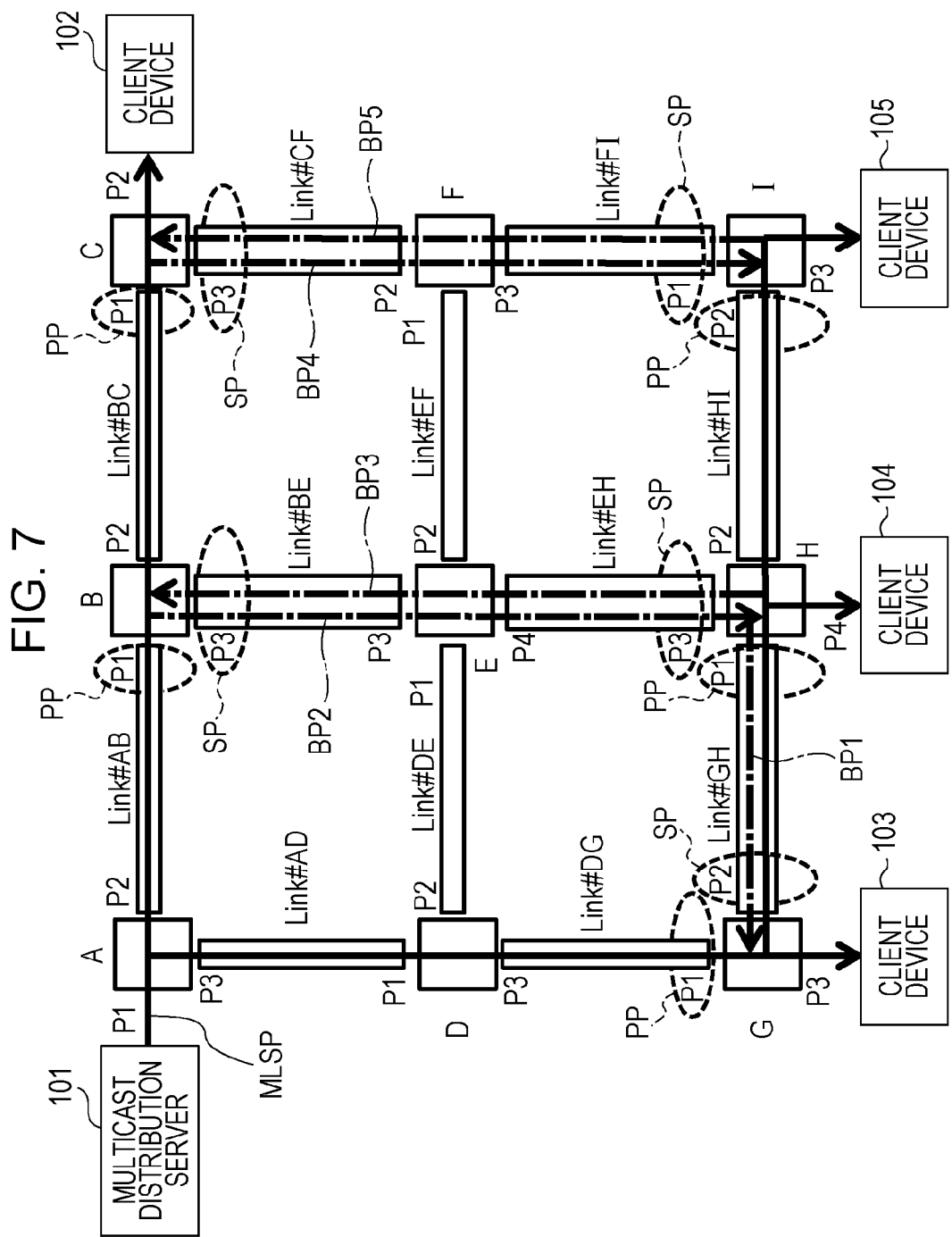
FIG. 7 is a diagram illustrating a detailed configuration of the MPLS-TP network system according to the embodiment.

Referring to FIG. 7 illustrating a detailed configuration of the system according to the embodiment, primary paths (PP) of the nodes C, G, H, and I, which are connected to the clients 102 to 105, respectively, are reception paths of the active multicast paths MLSP in the MPLS-TP network system SYS2.

A recovery branched path BP1 that extends from the node H to the node G in the link Link#GH is a secondary path (SP) that is used when the node G does not receive a multicast packet (MC packet) from the primary path PP of the node G.

A recovery branched path BP2 that extends from the node B through the node E to the node H in the links Link#BE and Link#EH is a secondary path SP that is used when the node H does not receive an MC packet from the primary path PP of the node H.

A recovery branched path BP3 that extends from the node H through the node E to the node B in the links Link#BE and Link#EH is a secondary path SP that is used when the node B does not receive an MC packet from a primary path PP of the node B.

A recovery branched path BP4 that extends from the node C through the node F to the node I in the links Link#CF and Link#FI is a secondary path SP that is used when the node I does not receive an MC packet from the primary path PP of the node I.

A recovery branched path BP5 that extends from the node I through the node F to the node C in the links Link#CF and Link#FI is a secondary path SP that is used when the node C does not receive an MC packet from the primary path PP of the node C.

Each of the secondary paths SP of the nodes B, C, G, H and I is a path to be used to receive an MC packet from an interested recovery branched path BP upon a failure of an active multicast path MLSP for the interested node and transmit an MC packet from the interested recovery branched path BP upon a failure of an active multicast path MLSP for a node other than the interested node.

The primary path PP of the node B is a reception path of an active multicast path MLSP for the secondary path SP of the node B.

Figure 8:
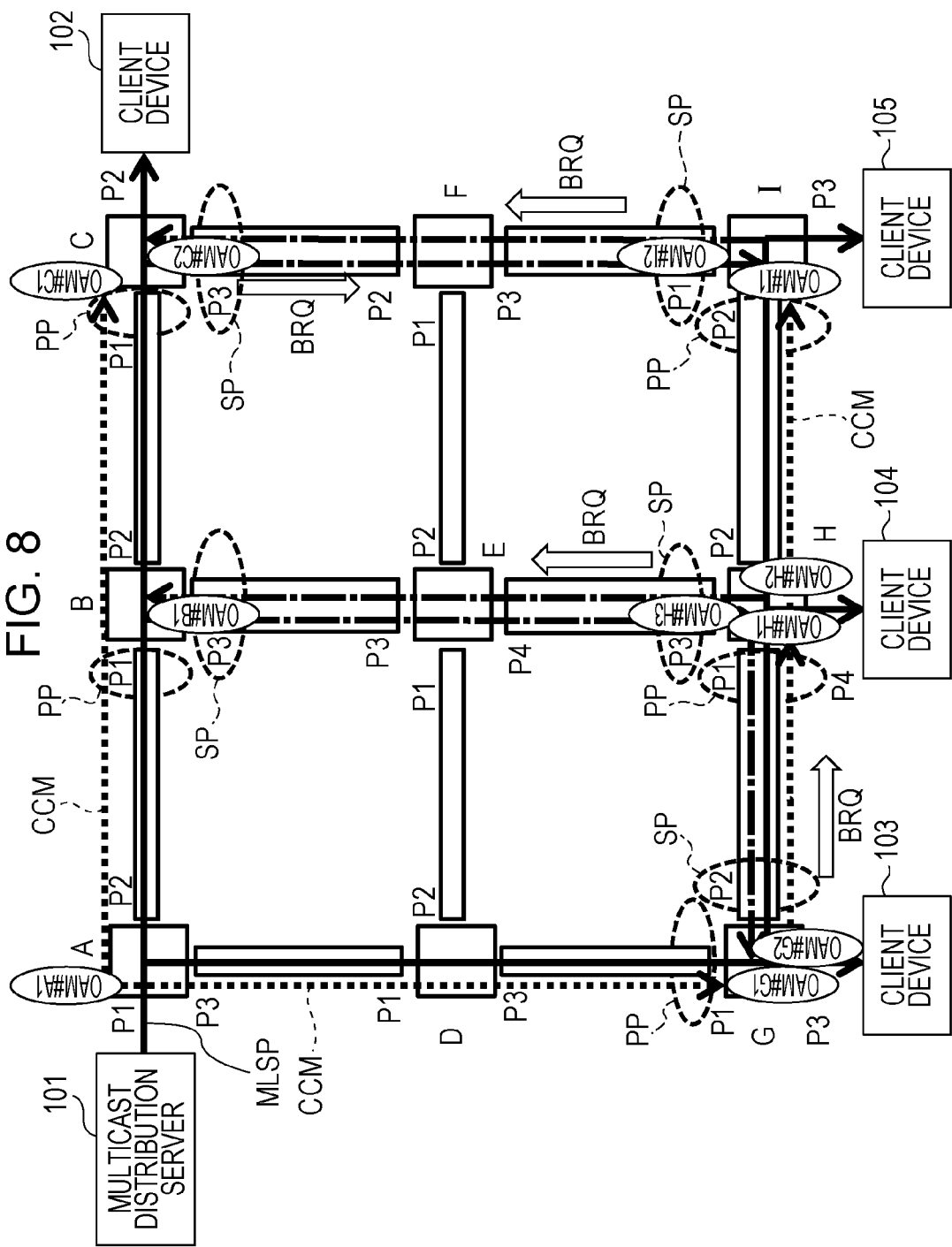
FIG. 8 is a block diagram illustrating the detailed configuration of the MPLS-TP network system according to the embodiment.

The starting-point node (or node for starting a distribution of a multicast packet) A of the active multicast paths MLSP illustrated in FIG. 7 and the nodes B, C, G, H, and I each having a primary path PP and a secondary path SP each have an operation administration and maintenance (OAM) packet processor OAM, as illustrated in FIG. 8.

An OAM packet processor OAM#A1 of the starting-point node A of the active multicast paths MLSP transmits a continuity check message (CCM) for path monitoring as an OAM packet CCM periodically (at predetermined time intervals) to the active multicast paths MLSP.

OAM packet processors OAM#G2 and OAM#H2 of the nodes G and H, which are among the nodes C, G, H, and I connected to the clients 102 to 105 and each relay an active multicast path MLSP to another node, each periodically transmit an OAM packet CCM to the nodes H and I, respectively, while the nodes H and I are relay destination nodes.

OAM packet processors OAM#C1, OAM#G1, OAM#H1, and OAM#I1 of the nodes C, G, H, and I connected to the clients 102 to 105 each monitor reception of an OAM packet CCM of an active multicast path MLSP and detect a failure state (loss of continuity (LOC)) of the active multicast path MLSP if the OAM packet CCM is not received within a predetermined time period (of, for example, 3.3 milliseconds, 10 milliseconds, or the like) that is selectable on the basis of an operation.

OAM packet processors OAM#B1, OAM#C2, OAM#G2, OAM#H3, and OAM#I2 of the nodes B, C, G, H, and I transmit and receive an OAM packet BRQ of a bridge request through the secondary paths SP. The OAM packet BRQ of the bridge request is a control packet indicating a request for recovery.

The MPLS-TP network system SYS2 according to the embodiment has the plurality of nodes that are connected to each other by the plurality of physical links so as to form the network and include a node configured to relay or terminate first and second active multicast paths MLSP branched in the first and second directions from the node for starting a distribution of a multicast packet and set in interested physical links.

A node, which does not periodically receive, through a primary port of the node, an OAM packet CCM provided for path monitoring and transmitted in a first active multicast path MLSP set in the first direction, transmits an OAM packet BRQ of a bridge request through a secondary port of the node.

When a node, which is configured to relay or terminate first and second active multicast paths MLSP branched in the first and second directions and periodically receives, through a primary port of the node, an OAM packet CCM transmitted in the second active multicast path MLSP set in the second direction receives an OAM packet BRQ of a bridge request through a secondary port of the node, the node receives, through the primary port, a multicast packet transmitted in the second active multicast path MLSP set in the second direction and bridges the multicast packet to a recovery branched path BP set in an interested physical link.

A node that does not receive an OAM packet CCM receives, through a secondary port of the node, a multicast packet bridged to a recovery branched path BP.

It is, therefore, possible to reduce a wasteful band upon recovery from a failure and suppress the number of path links used upon the recovery from the failure.

Nodes

Figure 9:
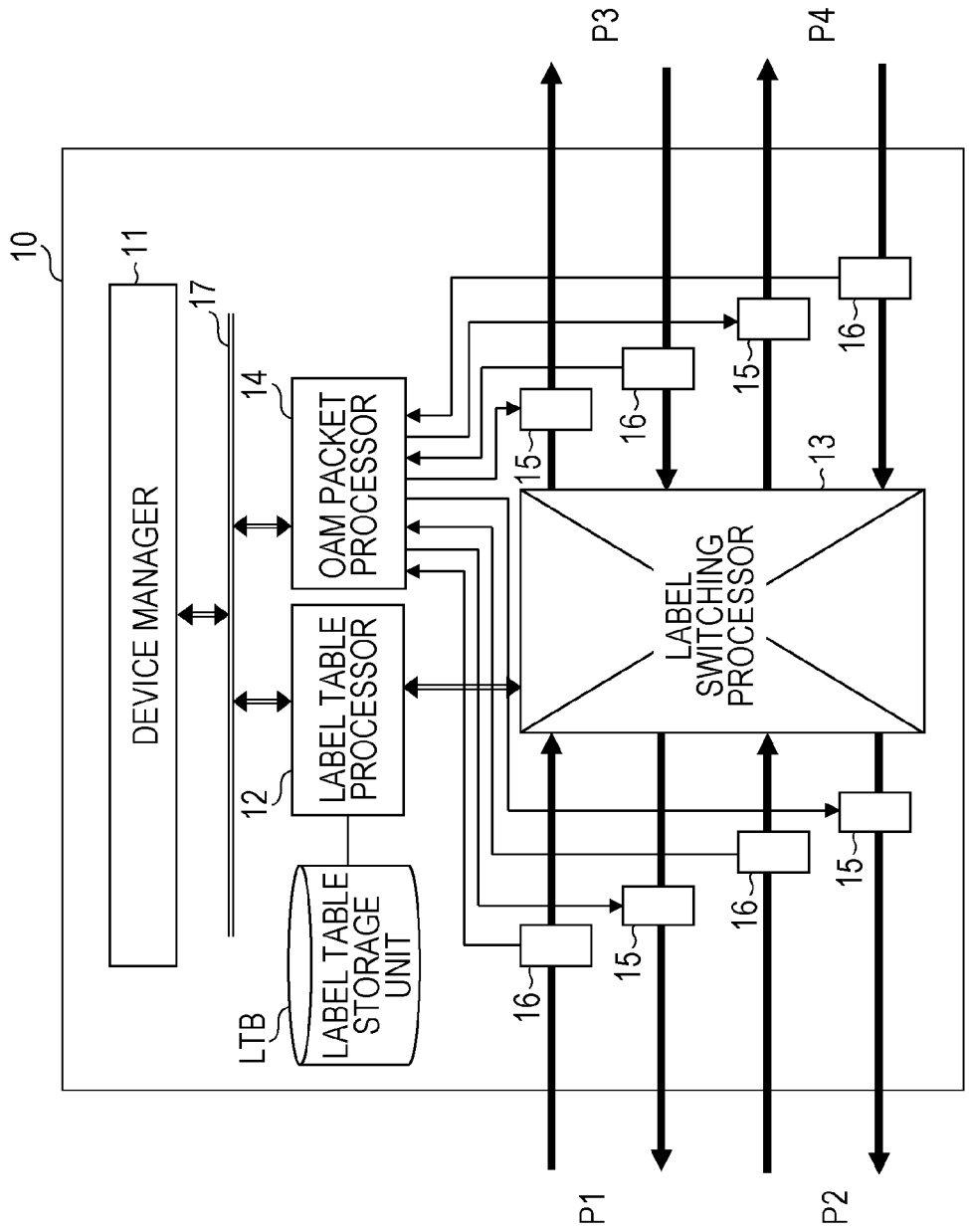
FIG. 9 is a block diagram illustrating a configuration of a node according to the embodiment.

Referring to FIG. 9 illustrating a configuration of a node included in the MPLS-TP network system SYS2 according to the embodiment, the node 10 (when a node that is any of the nodes A to I is not specified, the node is referred to as node 10) has interface ports P1 to P3 or P1 to P4 and includes a device manager 11, a label table processor 12, a label switching processor 13, an OAM packet processor 14, OAM packet inserters 15, OAM packet extractors 16, a bus 17, and a label table storage unit LTB.

The device manager 11 includes a user interface for various settings in the node 10 and a memory for holding (storing) details of the settings.

The label table processor 12 statically sets nodes, routing information, path type information, and requirement information (items and initial values) to a label table (refer to FIG. 10) stored in the storage unit LTB in accordance with an instruction provided by the device manager 11 according to an operation of an OAM operator (network operator) of the network management system NMS. The label table processor 12 dynamically sets values of the requirement information to the label table in accordance with an instruction from the OAM packet processor 14.

The label table processor 12 instructs the label switching processor 13 to execute routing and switches routing settings for the label switching processor 14 in accordance with an instruction from the OAM packet processor 14.

The label switching processor 13 routes a packet serving as a network transmission signal in accordance with the instruction provided by the label table processor 12 and based on the set information of the label table stored in the label table storage unit LTB. In order to bridge an MC packet in two directions (or to two paths) in accordance with an instruction from the OAM packet processor 14, the label switching processor 13 copies the MC packet and transmits copies of the MC packet in the two directions.

The OAM packet processor 14 monitors reception of an OAM packet CCM and reception of an OAM packet BRQ of a bridge request through the OAM packet inserters 15 and controls transmission of an OAM packet CCM and transmission of an OAM packet BRQ of a bridge request through the OAM packet extractors 16. FIG. 8 describes an example in which the OAM packet processors OAM#H1, OAM#H2, and OAM#H3 logically exist for the ports P1 to P3, for example. However, the one OAM packet processor 14 physically exists.

In the node 10, the device manager 11, the label table processor 12, the label switching processor 13, and the OAM packet processor 14 may be achieved by processing functions of at least one processor or may be constituted by individual circuit elements.

In order to logically achieve a failure recovery processing function (described later), a control program is installed as an application program in a disk serving as a nonvolatile flash memory in the node 10. The processor loads the control program into a random access memory (RAM) serving as a work memory and executes the control program.

Label Table

As illustrated in FIG. 10, the nodes, the routing information, the path type information, and the requirement information are associated with each other and stored in the label table within the label table storage unit LTB of the node 10 according to the embodiment.

The routing information includes input port numbers, input labels, output port numbers, and output labels. In the path type information, Primary, Secondary, P_to_S, and S_to_P indicate a primary path PP, a secondary path SP, switching from a primary path PP to a secondary path SP, and switching from a secondary path SP to a primary path PP, respectively.

The nodes, the routing information, the path type information, and the requirement information (items and initial values) are information that is statically set by the label table processor 12 in advance in accordance with an instruction provided by the device manager 11 according to an operation of the OAM operator (network operator) of the network management system NMS.

The requirement information includes valid requirements for the routing information and invalid requirements for the routing information. In the valid requirements for the routing information, Secondary=Y, P_to_S=Y, and S_to_P=Y indicate an enable state of a secondary path SP, an enable state of switching from a primary path PP to a secondary path SP, and an enable state of switching from a secondary path SP to a primary path PP. The routing information indicates that normal states of primary paths PP do not depend on the valid and invalid requirements.

In the invalid requirements for the routing information, Secondary=N, P_to_S=N, and S_to_P=N indicate a disable state of a secondary path SP, a disable state of switching from a primary path PP to a secondary path SP, and a disable state of switching from a secondary path SP to a primary path PP. The routing information indicates that the normal states of the primary paths PP do not depend on the valid and invalid requirements.

Set values of the requirement information are information that is dynamically set by the label table processor 12 in accordance with an instruction from the OAM packet processor 14. Specifically, the values of the requirement information are set by the label table processor 12 in response to the execution of a process (described later) by the OAM packet processor 14.

OAM Packet Processor

A maintenance end point (MEP) process that is executed by the OAM packet processor 14 of the node 10 (illustrated in FIG. 9) according to the embodiment on a part terminating OAM is described below.

Figure 11A:
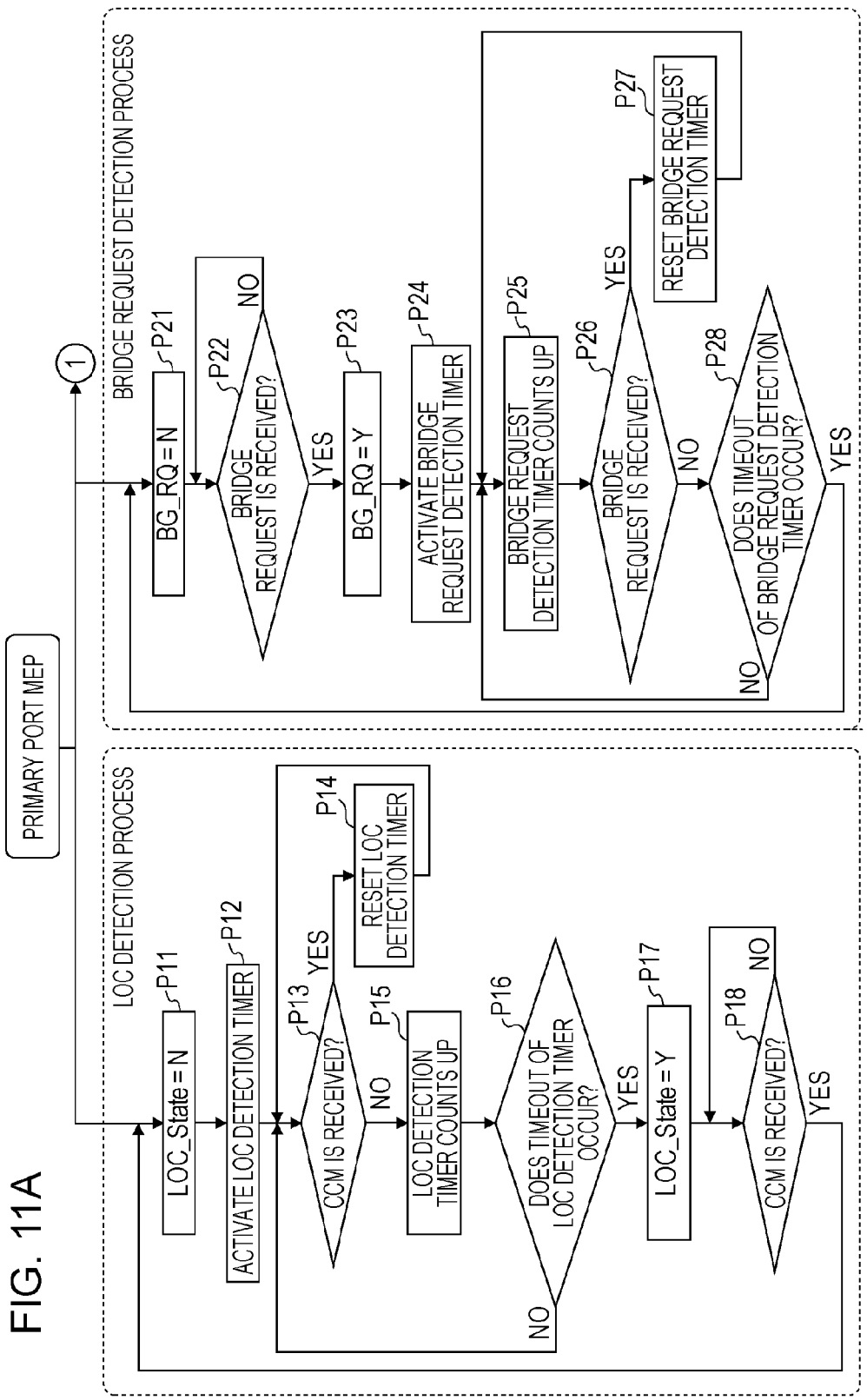
FIG. 11A is a flowchart of a process that is executed by an OAM packet processor of the node according to the embodiment.
Figure 11B:
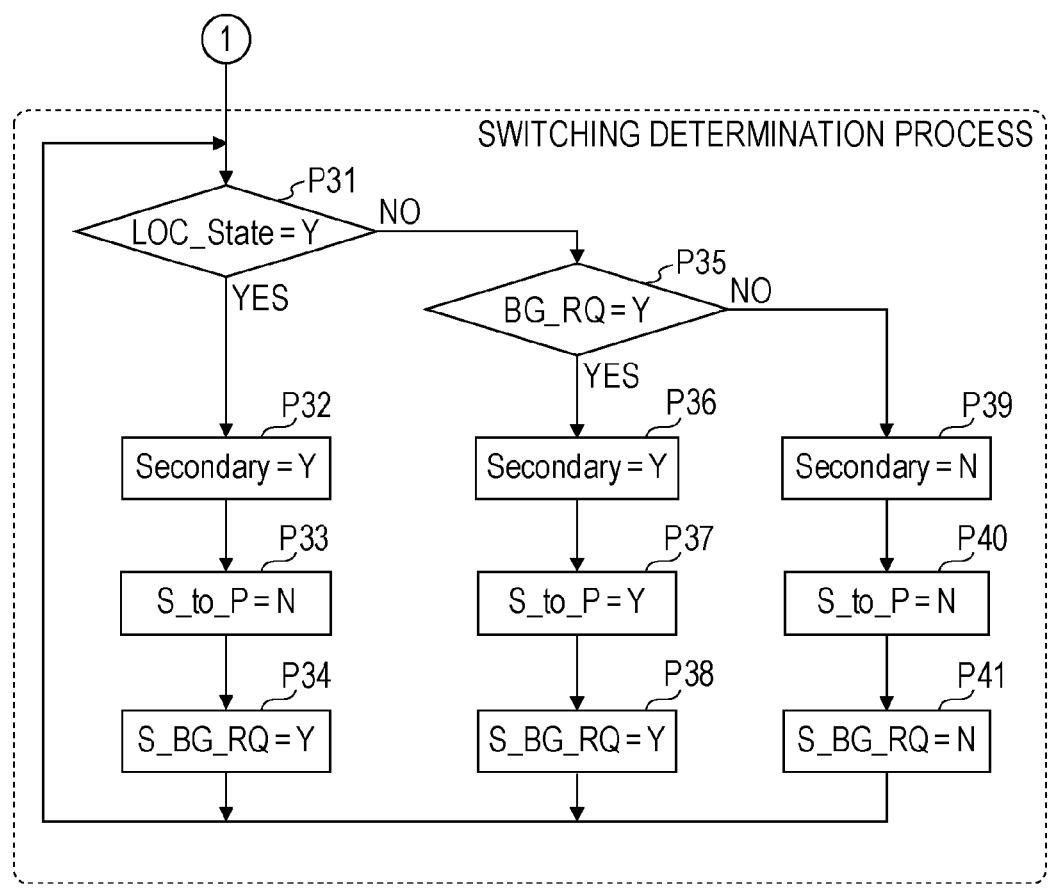
FIG. 11B is a flowchart of the process that is executed by the OAM packet processor of the node according to the embodiment.

FIGS. 11A and 11B describe the process to be executed on a primary port of the node 10 by the OAM packet processor 14.

In an LOC detection process, the OAM packet processor 14 monitors, through the primary port, reception of an OAM packet CCM for path monitoring. If the OAM packet CCM is not periodically received, the OAM packet processor 14 notifies a switching determination process of LOC_State=Y of an LOC state flag or a failure state (non-communicating state).

Specifically, the LOC detection process is executed in accordance with the following process procedure. In P11 indicating LOC_State=N, the LOC state flag is initially set to a normal state (communicating state).

In P12, an LOC detection timer is activated. In P13 indicating a determination about reception of a CCM, whether or not the OAM packet CCM has been received is determined.

If the answer to P13 is positive, the LOC detection timer is reset in P14 and the process returns to P13.

If the answer to P13 is negative, the LOC detection timer counts up in P15.

In P16, whether or not a timeout of the LOC detection timer has occurred is determined. If the answer to P16 is negative, the process returns to P13.

If the answer to P16 is positive, the LOC state flag is set to the failure state in P17 indicating LOC_State=Y and the OAM packet processor 14 notifies the switching determination process of the failure state.

In P18 indicating a determination about reception of a CCM, whether or not the OAM packet CCM has been received is determined. If the answer to P18 is positive, the process returns to P11. If the answer to P18 is negative, the OAM packet processor 14 waits until the OAM packet CCM is received.

In a bridge request detection process, the OAM packet processor 14 monitors, through the primary port, reception of a bridge request. If the bridge request is received, the OAM packet processor 14 notifies the switching determination process of BG_RQ=Y or a bridge request's present state. If the bridge request is received and another bridge request is not received within a predetermined time period, the OAM packet processor 14 notifies the switching determination process of BG_RQ=N indicating a bridge request's absent state.

Specifically, the bridge request detection process is executed in accordance with the following process procedure. In P21 indicating BG_RQ=N, a bridge request state flag is initially set to the bridge request's absent state.

In P22 indicating a determination about reception of a bridge request, whether or not an OAM packet BRQ of the bridge request has been received is determined. If the answer to P22 is negative, the OAM packet processor 14 waits until the OAM packet BRQ of the bridge request is received.

If the answer to P22 is positive, the bridge request state flag is set to the bridge request's present state in P23 indicating BG_RQ=Y and the OAM packet processor 14 notifies the switching determination process of the bridge request's present state.

In P24, a bridge request detection timer is activated. In P25, the bridge request detection timer counts up.

In P26 indicating a determination about reception of a bridge request, whether or not an OAM packet BRQ of the bridge request has been received is determined.

If the answer to P26 is positive, the bridge request detection timer is reset in P27 and the process returns to P25.

If the answer to P26 is negative, whether or not a timeout of the bridge request detection timer has occurred is determined in P28. If the answer to P28 is negative, the process returns to P25. If the answer to P28 is positive, the process returns to P21.

In the switching determination process, a valid requirement for the routing information and an invalid requirement for the routing information that correspond to Secondary (secondary path SP) and S_to_P (switching from the secondary path SP to the primary path PP) of the path type information are determined in accordance with LOC_State=Y (failure state) notified in the LOC detection process or BG_RQ=Y (bridge request's present state) notified in the bridge request detection process. In addition, the OAM packet processor 14 instructs the label table processor 12 to set the requirement information of the label table. Furthermore, an instruction to transmit a bridge request is provided on the basis of S_BG_RQ for a bridge request transmission process that is executed by the OAM packet processor 14 on the secondary port of the node 10.

Specifically, the switching determination process is executed in accordance with the following process procedure. In P31 indicating a determination about LOC_State=Y, whether or not the LOC state flag indicates the failure state (non-communicating state) is determined.

If the answer to P31 is positive, the secondary path SP is set to an enable state in P32 indicating Secondary=Y.

In P33 indicating S_to_P=N, the switching from the secondary path SP to the primary path PP is set to a disable state.

In P34 indicating S_BG_RQ=Y, a bridge request state flag for the secondary port is set to a bridge request's present state.

If the answer to P31 is negative, whether or not the bridge request state flag indicates the bridge request's present state is determined in P35 indicating a determination about BG_RQ=Y.

If the answer to P35 is positive, the secondary path SP is set to the enable state in P36 indicating Secondary=Y.

In P37 indicating S_to_P=Y, the switching from the secondary path SP to the primary path PP is set to an enable state.

In P38 indicating S_BG_RQ=Y, the bridge request state flag for the second port is set to the bridge request's present state.

If the answer to P35 is negative, the secondary path SP is set to the disable state in P39 indicating Secondary=N.

In P40 indicating S_to_P=N, the switching from the secondary path SP to the primary path PP is set to the disable state.

In P41 indicating S_BG_RQ=N, the bridge request state flag for the secondary port is set to a bridge request's absent state.

Figure 12:
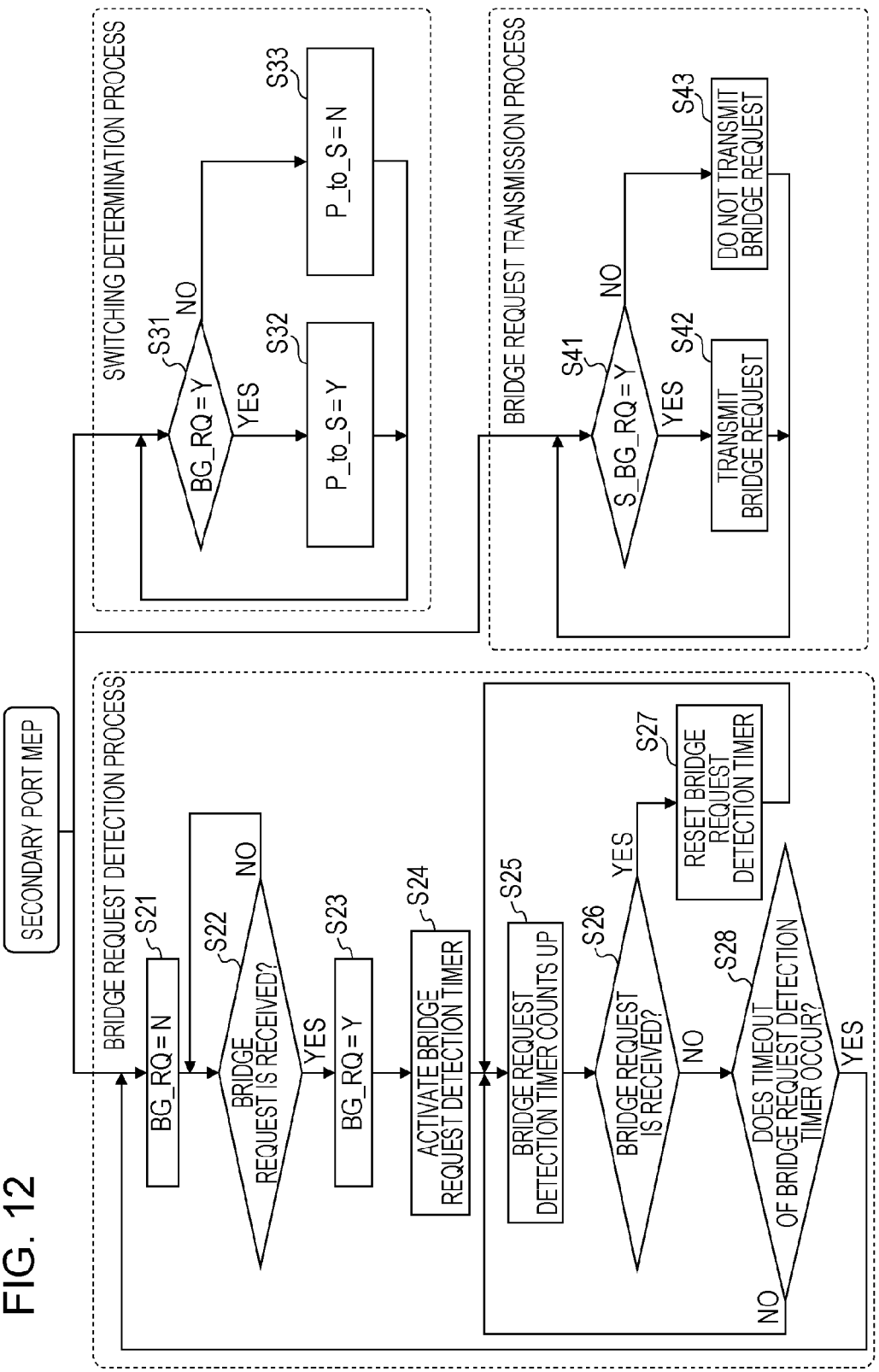
FIG. 12 is a flowchart of a process that is executed by the OAM packet processor of the node according to the embodiment.

FIG. 12 is a flowchart of a process that is executed on the secondary port of the node 10 by the OAM packet processor 14.

In the bridge request detection process, the OAM packet processor 14 monitors reception of a bridge request. If the bridge request is received, the OAM packet processor 14 notifies the switching determination process of BG_RQ=Y or the bridge request's present state. If the bridge request is received and another bridge request is not received within the predetermined time period, the OAM packet processor 14 notifies the switching determination process of BG_RQ=N or the bridge request's absent state.

Specifically, the bridge request detection process is executed in accordance with the following process procedure. In S21 indicating BG_RQ=N, the bridge request state flag is initially set to the bridge request's absent state.

In S22 indicating a determination about reception of a bridge request, whether or not an OAM packet BRQ of the bridge request has been received is determined. If the answer to S22 is negative, the OAM packet processor 14 waits until the OAM packet BRQ of the bridge request is received.

If the answer to S22 is positive, the bridge request state flag is set to the bridge request's present state in S23 indicating BG_RQ=Y and the OAM packet processor 14 notifies the switching determination process of the bridge request's present state.

In S24, the bridge request detection timer is activated. In S25, the bridge request detection timer counts up.

In S26 indicating a determination about reception of a bridge request, whether or not an OAM packet BRQ of the bridge request has been received is determined.

If the answer to S26 is positive, the bridge request detection timer is reset in S27 and the process returns to S25.

If the answer to S26 is negative, whether or not a timeout of the bridge request detection timer has occurred is determined in S28. If the answer to S28 is negative, the process returns to S25. If the answer to S28 is positive, the process returns to S21.

In the switching determination process, a valid requirement for the routing information and an invalid requirement for the routing information that correspond to P_to_S (switching from the primary path PP to the secondary path SP) of the path type information are determined in accordance with BG_RQ=Y (bridge request's present state) notified in the bridge request detection process. In addition, the OAM packet processor 14 instructs the label table processor 12 to set the requirement information of the label table.

Specifically, the switching determination process is executed in the following process procedure. In S31 indicating a determination about BG_RQ=Y, whether or not the bridge request state flag indicates the bridge request's present state is determined.

If the answer to S31 is positive, the switching from the primary path PP to the secondary path SP is set to an enable state in S32 indicating P_to_S=Y.

If the answer to S31 is negative, the switching from the primary path PP to the secondary path SP is set to a disable state in S33 indicating P_to_S=N.

In the bridge request transmission process, the transmission of the bridge request to the secondary port is controlled in accordance with an instruction to execute the switching determination process on the primary port by the OAM packet processor 14.

Specifically, the bridge request transmission process is executed in accordance with the following process procedure. In S41 indicating a determination about S_BG_RQ=Y, whether or not the bridge request state flag for the secondary port indicates the bridge request's present state is determined.

If the answer to S41 is positive, an OAM packet BRQ of a bridge request is transmitted to the secondary port in S42 indicating the transmission of the bridge request and the process returns to S41.

If the answer to S41 is negative, the OAM packet BRQ of the bridge request is not transmitted to the secondary port in S43 indicating non-transmission of the bridge request and the process returns to S41.

Figure 13:
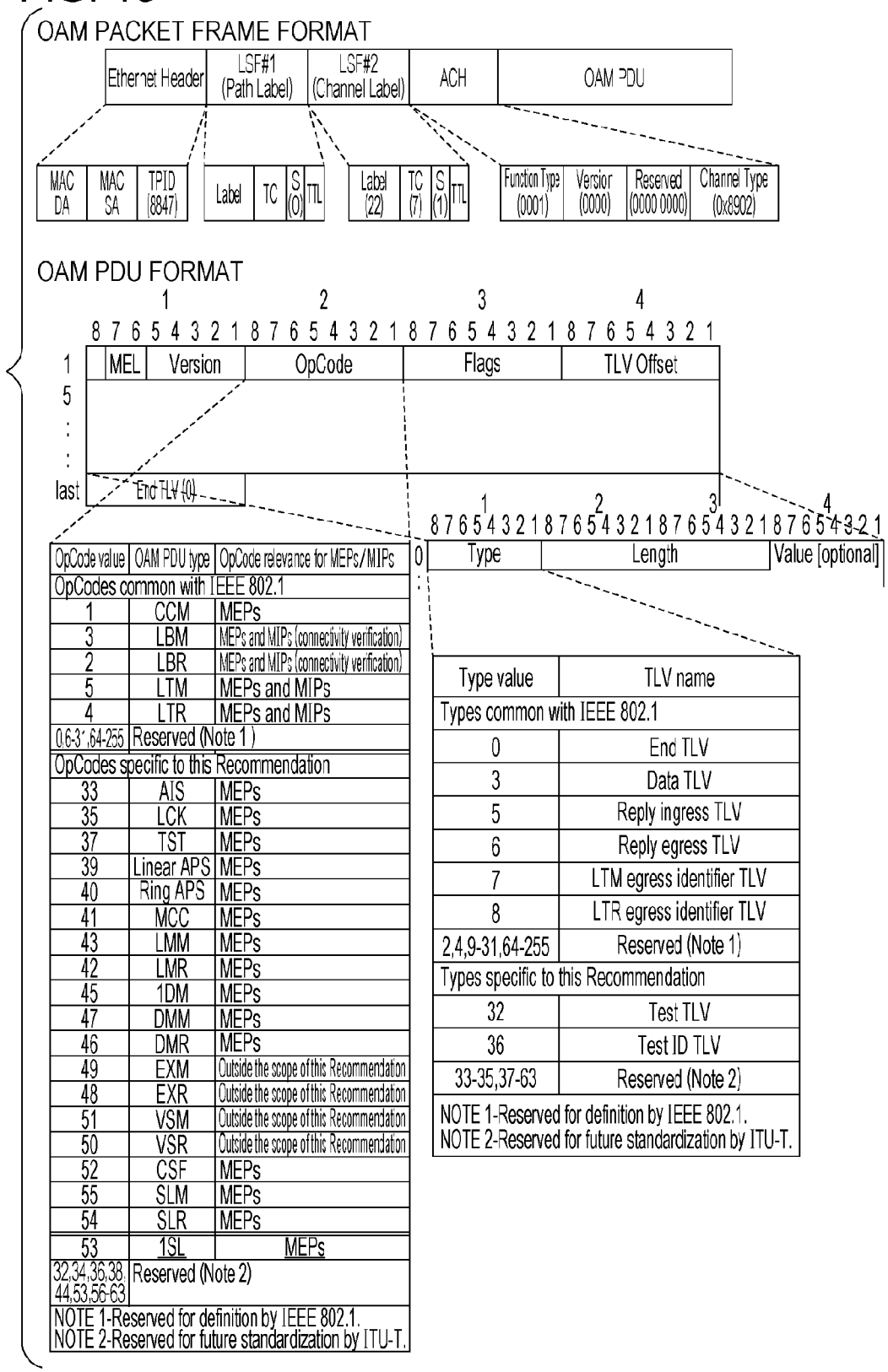
FIG. 13 is a diagram describing an OAM packet applied to the system according to the embodiment.

FIG. 13 illustrates an OAM packet frame format defined by International Telecommunication Union-Telecommunication Standardization Sector (ITU-T) G.8013 (July, 2011), ITU-T Y.1731 (July, 2011), and ITU-T Amd.1 (May, 2012).

Label stack fields (LSFs) #1 and #2 included in the frame are stackable MPLS-TP label portions. The LSF #1 (path label) is the label portion used for routing and has a "label" field in which a label value (ab, ad, or the like in the embodiment) is set. The LSF #2 (channel label) is used to distinguish between a data packet to be used to transmit an operational signal and an OAM packet, and a specific value set in a "label" field of the LSF #2 is assigned to the OAM packet.

In addition, an OAM protocol data unit (PDU) includes a maintenance entity group (MEG) level (MEL), OpCode, flags, and TLV Offset. The MEL is OAM level information and OpCode indicates the type of the OAM PDU. Purposes for use of the flags of the OAM PDU are determined on the basis of the type of the OAM PDU, and TLV Offset indicates the position of a top TLV within the OAM PDU.

If OpCode is a value of 1, OpCode indicates a CCM. Values of 32, 34, 36, 38, 44, and 56 to 63 are not used for OpCode, and OpCode=56 is assigned to a bridge request, for example.

Failure Recovery Process

Next, examples of a failure recovery process that is executed by the MPLS-TP network system SYS2 according to the embodiment are described with reference to related drawings.

Normal State

Figure 14:
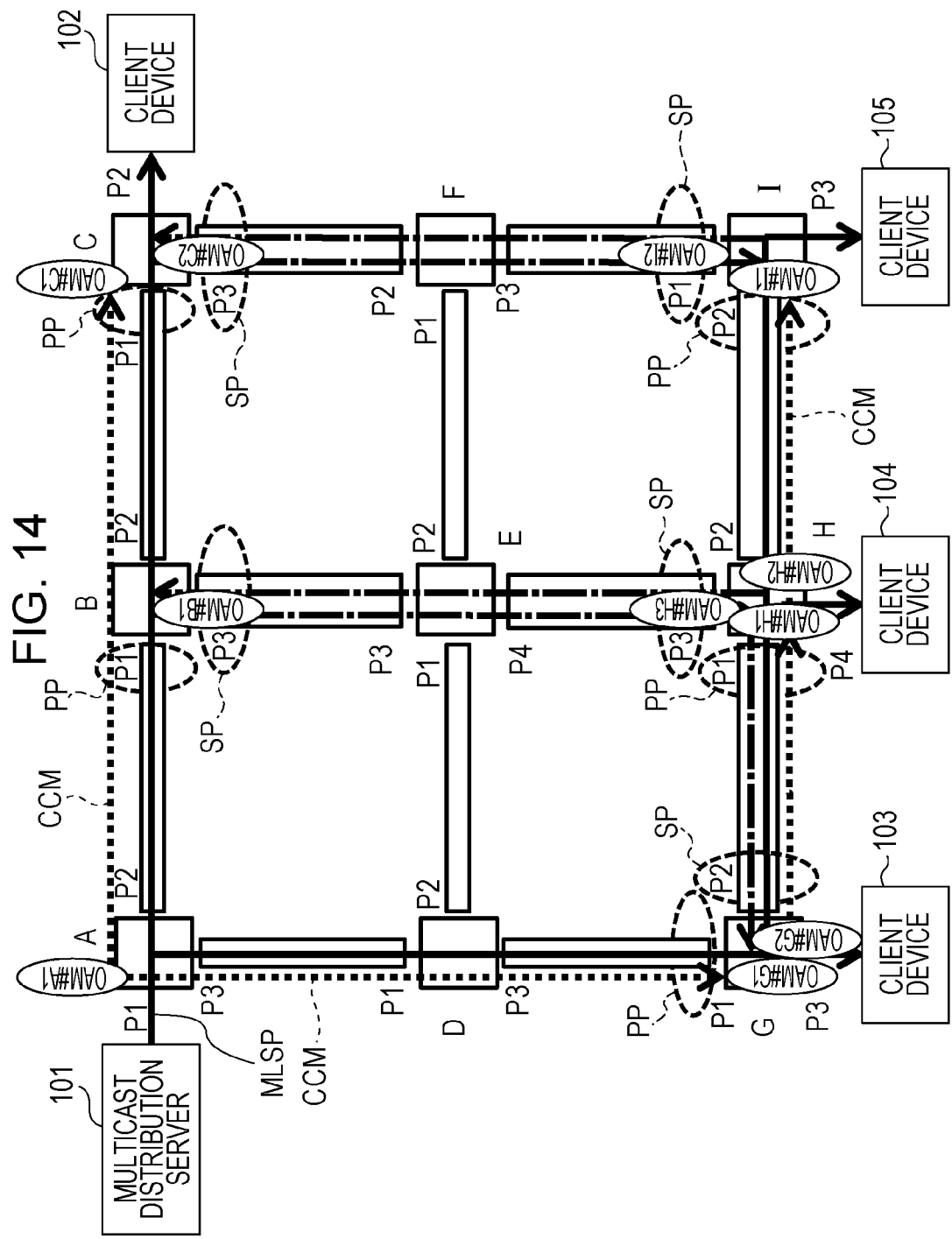
FIG. 14 is a diagram describing a failure recovery process that is executed by the system according to the embodiment.

FIG. 14 illustrates the MPLS-TP network system SYS2 that is in a normal state. The OAM packet processors OAM#A1, OAM#G2, and OAM#H2 of the nodes A, G, and H each transmit an OAM packet CCM on the active multicast paths MLSP. The OAM packet processors OAM#C1, OAM#G1, OAM#H1, and OAM#I1 of the nodes C, G, H, and I each receive an OAM packet CCM periodically (at predetermined time intervals) and determine that the MPLS-TP network system SYS2 is in the normal state.

Specifically, in the normal state illustrated in FIG. 14, the OAM packet processors 14 (reference numeral 14 is used when the OAM packet processors are not specified) of the nodes G, H, and B operate as follows, for example.

In each of the nodes G, H, and B, initial values of the following parameters are N. (1) LOC_State=N (the LOC state flag indicates the normal state or the communicating state), (2) BG_RQ=N (a bridge request state flag for the primary port or secondary port indicates a bridge request's absent state), (3) S_BG_RQ=N (the bridge request state flag for the secondary port indicates the bridge request's absent state), (4) Secondary=N (the secondary path SP is in the disable state), (5) S_to_P=N (the switching from the secondary path SP to the primary path PP is in the disable state), (6) P_to_S=N (the switching from the primary path PP to the secondary path SP is in the disable state). The OAM packet processor OAM#G1 executes the following process on the primary port P1 of the node G (refer to FIGS. 11A and 11B).

In G11, the OAM packet processor OAM#G1 maintains LOC_State=N (communicating state) of the LOC state flag in the LOC detection process, since the OAM packet processor OAM#G1 periodically receives an OAM packet CCM from the OAM packet processor OAM#A1 of the node A.

In G12, the OAM packet processor OAM#G1 maintains BG_RQ=N (bridge request's absent state) of the bridge request state flag for the primary port in the bridge request detection process, since the OAM packet processor OAM#A1 does not transmit a bridge request.

In G13, the OAM packet processor OAM#G1 maintains Secondary=N (disable state) of the secondary path SP, S_to_P=N (disable state) of the switching from the secondary path SP to the primary path PP, and S_BG_RQ=N (invalid state) of the bridge request state flag for the second port, since LOC_State=N (communicating state) and BG_RQ=N (bridge request's absent state) are set in the switching determination process.

The OAM packet processor OAM#G2 executes the following process on the secondary port P2 of the node G (refer to FIG. 12).

In G21, the OAM packet processor OAM#G2 maintains BG_RQ=N (bridge request's absent state) in the bridge request detection process, since the OAM packet processor OAM#H1 of the node H does not transmit a bridge request.

In G22, the OAM packet processor OAM#G2 maintains, on the basis of S_BG_RQ=N (bridge request's absent state) maintained in the aforementioned G13, a state in which a bridge request is not transmitted in the bridge request transmission process.

In G23, the OAM packet processor OAM#G2 maintains P_to_S=N (disable state) in the switching determination process on the basis of BG_RQ=N (bridge request's absent state) maintained in the aforementioned G12.

The OAM packet processor OAM#G2 executes the following process on requirement information of the node G (refer to FIG. 10).

In G31, the OAM packet processor OAM#G2 maintains, on the basis of Secondary=N (disable state) maintained in the aforementioned G13, routing information on the node G in the label table or maintains invalid states of an input port P2, input label gh, output port P3, and output label "-" (no information).

The OAM packet processor OAM#H1 executes the following process on the primary port P1 of the node H (refer to FIGS. 11A and 11B).

In H11, the OAM packet processor OAM#H1 maintains LOC_State=N (communicating state) in the LOC detection process, since the OAM packet processor OAM#H1 periodically receives an OAM packet CCM from the OAM packet processor OAM#G2.

In H12, the OAM packet processor OAM#H1 maintains BG_RQ=N (bridge request's absent state) in the bridge request detection process, since the OAM packet processor OAM#G2 does not transmit an OAM packet BRQ of a bridge request.

In H13, the OAM packet processor OAM#H1 maintains Secondary=N (disable state), S_to_P=N (disable state), and S_BG_RQ=N (bridge request's absent state), since LOC_State=N (communicating state) and BG_RQ=N (bridge request's absent state) are set in the switching determination process.

The OAM packet processor OAM#H3 executes the following process on the primary port P3 of the node H (refer to FIG. 12).

In H21, the OAM packet processor OAM#H3 maintains BG_RQ=N (bridge request's absent state) in the bridge request detection process, since the OAM packet processor OAM#B1 does not transmit an OAM packet BRQ of a bridge request.

In H22, the OAM packet processor OAM#H3 maintains, on the basis of S_BG_RQ=N (bridge request's absent state) maintained in the aforementioned H13, a state in which a bridge request is not transmitted in the bridge request transmission process.

In H23, the OAM packet processor OAM#H3 maintains P_to_S=N (disable state) in the switching determination process on the basis of BG_RQ=N (bridge request's absent state) maintained in the aforementioned H12.

The OAM packet processor OAM#H3 executes the following process on requirement information of the node H (refer to FIG. 10).

In H31, the OAM packet processor OAM#H3 maintains routing information on the node H in the label table on the basis of Secondary=N (disable state) maintained in the aforementioned H13 or maintains invalid states of an input port P2, input label eh, output port P2, and output label hi and invalid states of the input port P3, input label eh, output port P4, and output label "-" (no information).

In H32, the OAM packet processor OAM#H3 maintains routing information on the node H in the label table on the basis of S_to_P=N (disable state) maintained in the aforementioned H13 or maintains invalid states of the input port P3, input label eh, output port P1, and output label gh.

The OAM packet processor OAM#B1 does not execute the MEP process on the primary port P1 of the node B.

The OAM packet processor OAM#B1 executes the following process on the secondary port P3 of the node B (refer to FIG. 12).

In B21, the OAM packet processor OAM#B1 maintains BG_RQ=N (bridge request's absent state) in the bridge request detection process, since the OAM packet processor OAM#H3 does not transmit an OAM packet BRQ of a bridge request.

In B22, the OAM packet processor OAM#B1 maintains a state in which a bridge request is not transmitted in the bridge request transmission process on the basis of S_BG_RQ=N (bridge request's absent state) that is the initial value.

In B23, the OAM packet processor OAM#B1 maintains P_to_S=N (disable state) in the switching determination process on the basis of S_BG_RQ=N (bridge request's absent state) maintained in the aforementioned H21.

The OAM packet processor OAM#B1 executes the following process on requirement information of the node B (refer to FIG. 10).

In B31, the OAM packet processor OAM#B1 maintains routing information on the node B in the label table on the basis of P_to_S=N (disable state) maintained in the aforementioned B23 or maintains invalid states of an input port P1, input label ab, output port P3, and output label be.

Failure State

A first failure recovery process that is executed on the link Link#DG between the node D and the node G is described with reference to FIGS. 15, 16, 17, and 18.

Figure 15:
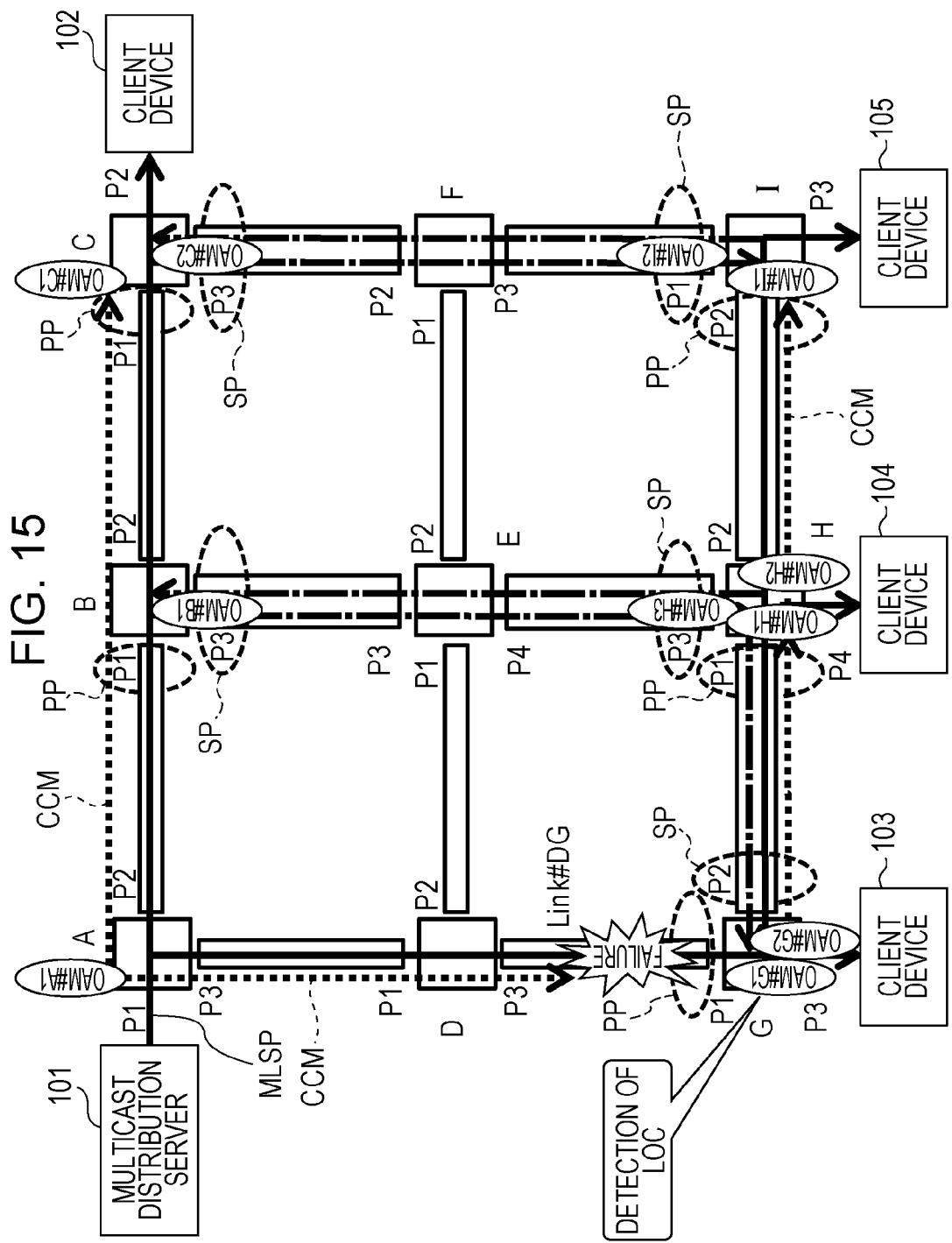
FIG. 15 is a diagram describing the failure recovery process that is executed by the system according to the embodiment.

FIG. 15 illustrates a state in which a failure occurs in the link Link#DG between the node D and the node G. Since the OAM packet processor OAM#G1 of the node G does not periodically receive an OAM packet CCM from the OAM packet processor OAM#A1 of the node A through interested active multicast paths MLSP due to the failure of the link Link#DG, the OAM packet processor OAM#G1 detects an LOC (failure state).

Figure 16:
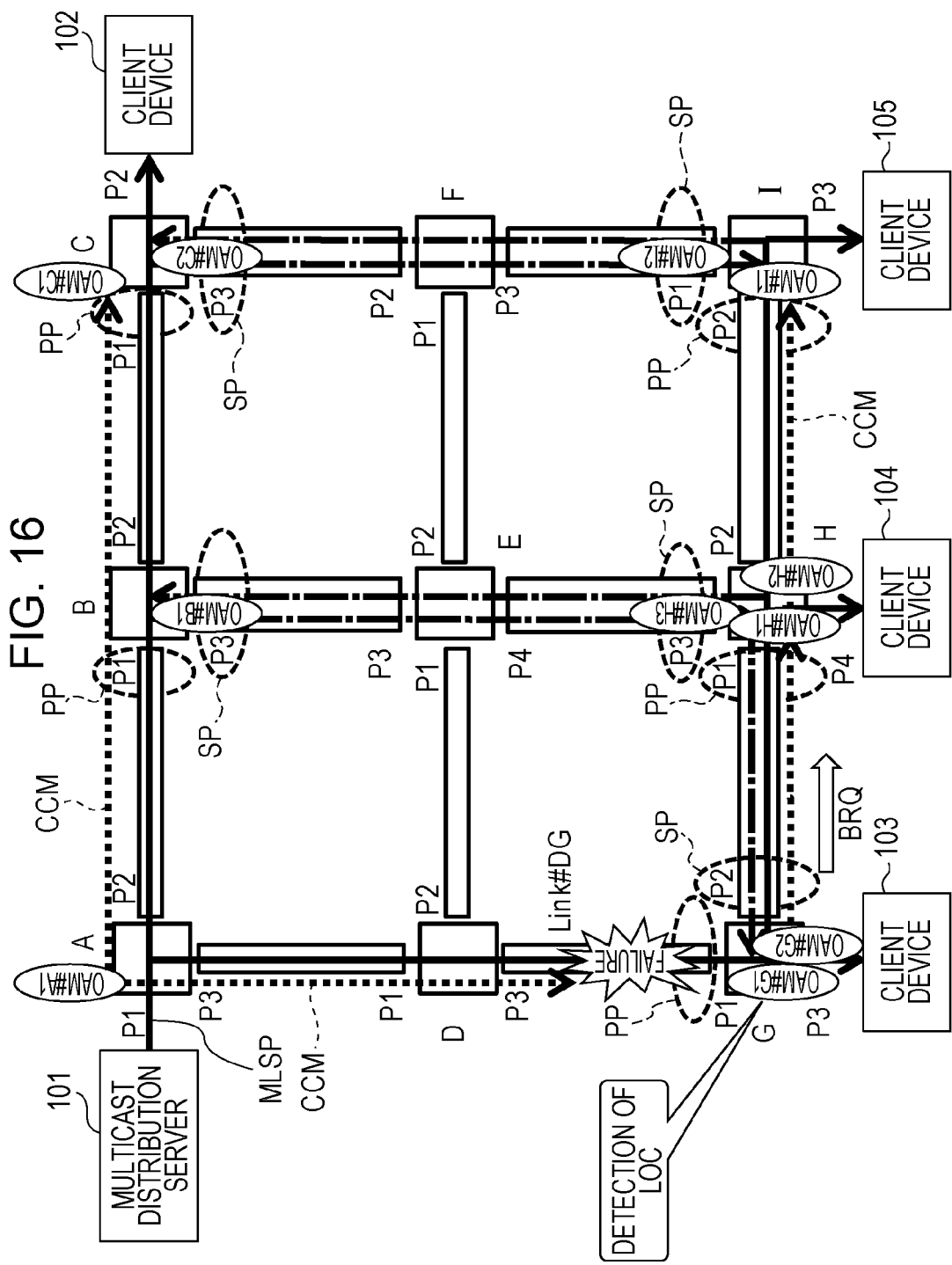
FIG. 16 is a diagram describing the failure recovery process that is executed by the system according to the embodiment.

Next, as illustrated in FIG. 16, for the node G that has detected the LOC of the primary path PP for the active multicast path MLSP, the OAM packet processor OAM#G2 for the secondary path SP transmits an OAM packet BRQ of a bridge request through the active multicast path MLSP.

Figure 17:
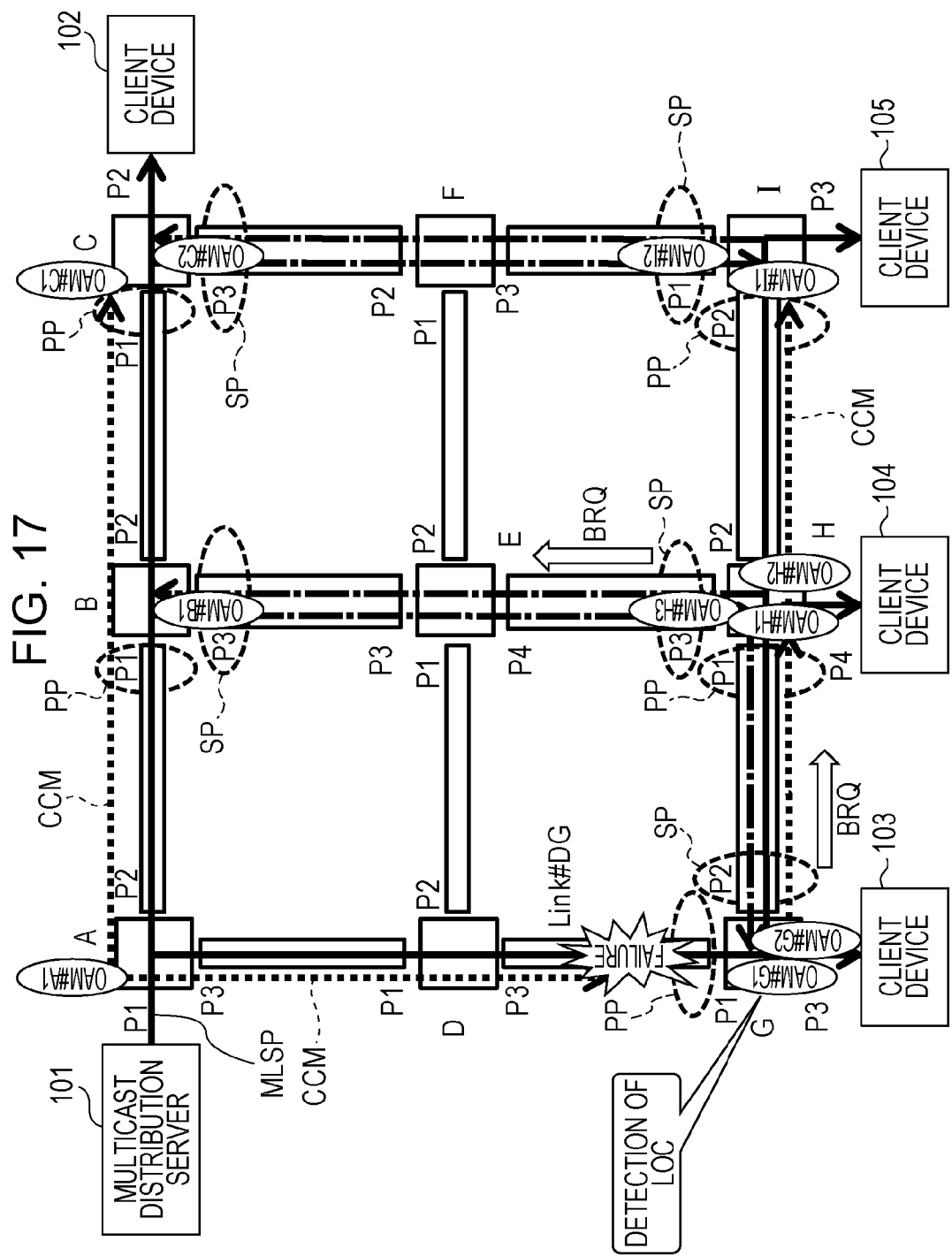
FIG. 17 is a diagram describing the failure recovery process that is executed by the system according to the embodiment.

As illustrated in FIG. 17, for the node H that has received the OAM packet BRQ of the bridge request through the primary path PP, the OAM packet processor OAM#H3 for the secondary path SP transmits an OAM packet BRQ of a bridge request through the recovery branched path BP.

Figure 18:
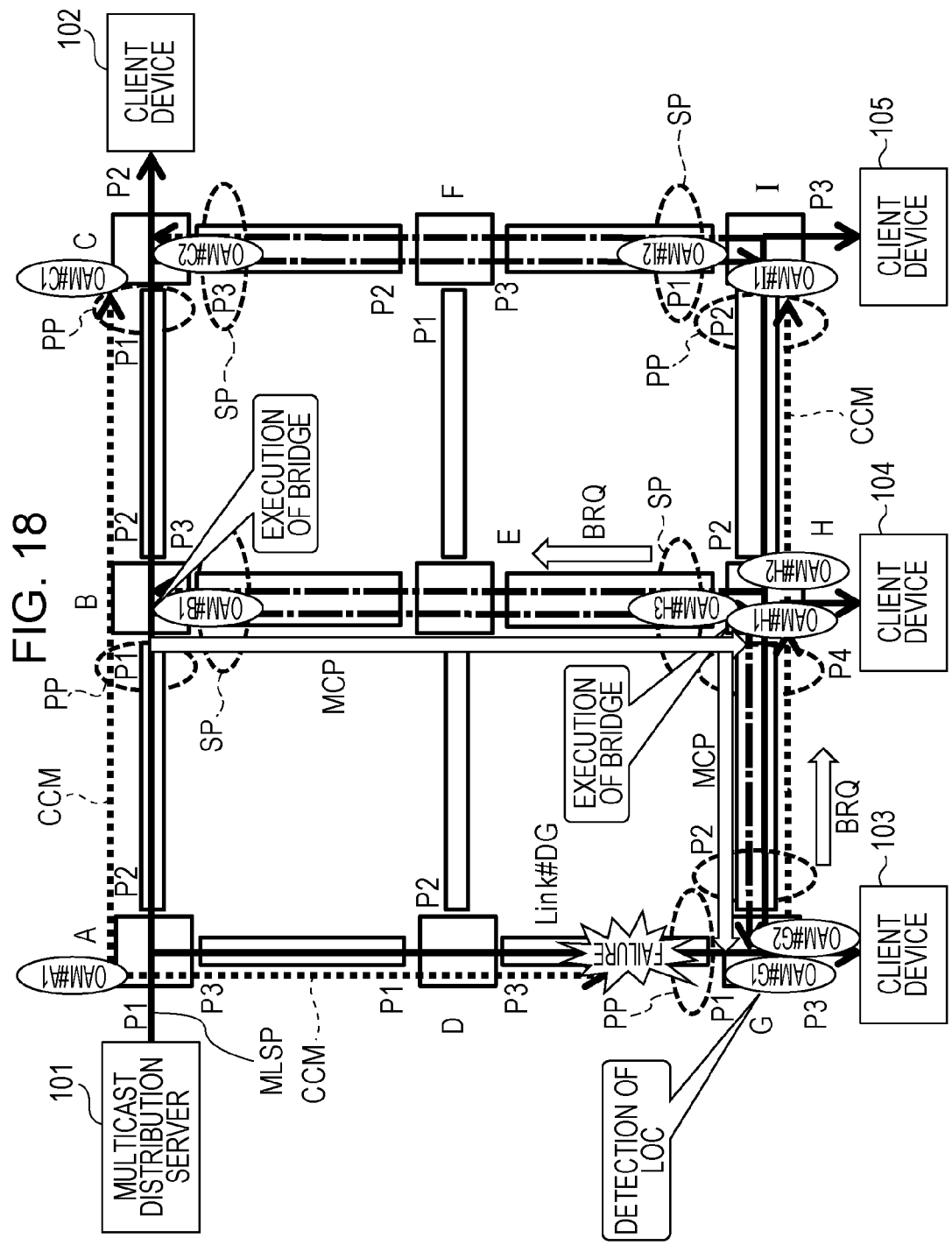
FIG. 18 is a diagram describing the failure recovery process that is executed by the system according to the embodiment.

As illustrated in FIG. 18, the node B that has received the OAM packet BRQ of the bridge request through the secondary path SP bridges a recovery MC packet of an interested active multicast path MLSP to the secondary path SP. The recovery MC packet MCP bridged by the node B reaches the secondary path SP of the node H through the recovery branched path BP extending through the node E and located between the nodes B and H on the links Link#BE and Link#EH. The OAM packet processor OAM#H3 bridges the recovery MC packet MCP of the secondary path SP to the primary path PP that has received the OAM packet BRQ of the bridge request.

Thus, the active multicast path MLSP for the node G is recovered and active multicast paths MLSP for the nodes H and I are recovered.

A second failure recovery process that is executed on the link Link#HI between the node H and the node I is described with reference to FIGS. 19, 20, and 21.

Figure 19:
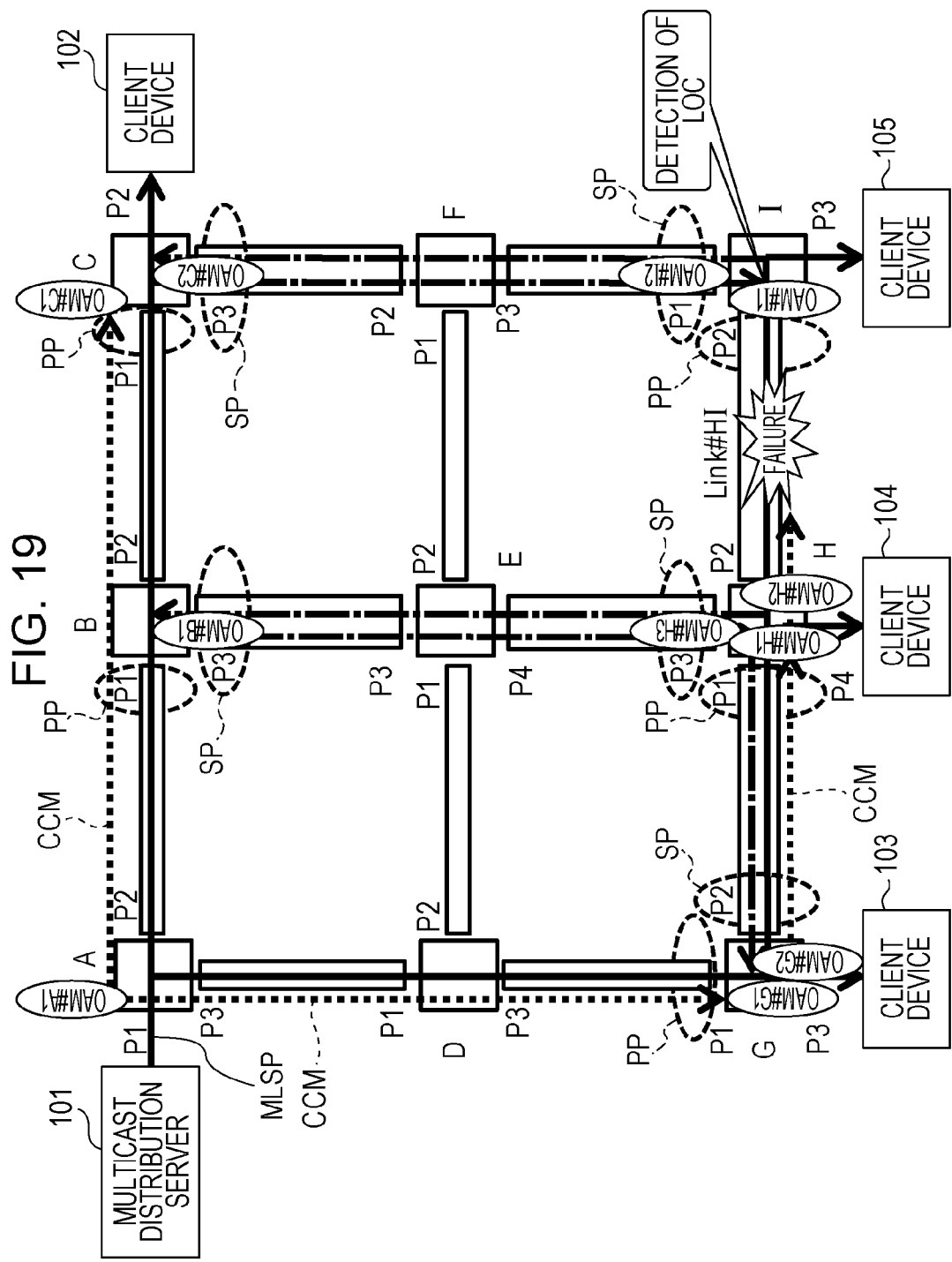
FIG. 19 is a diagram describing the failure recovery process that is executed by the system according to the embodiment.

FIG. 19 illustrates a state in which a failure occurs in the link Link#HI between the node H and the node I. The OAM packet processor OAM#I1 of the node I does not periodically receive an OAM packet CCM from the OAM packet processor OAM#H2 of the node H through the interested active multicast path MLSP due to the failure of the link Link#HI and thereby detects an LOC.

Figure 20:
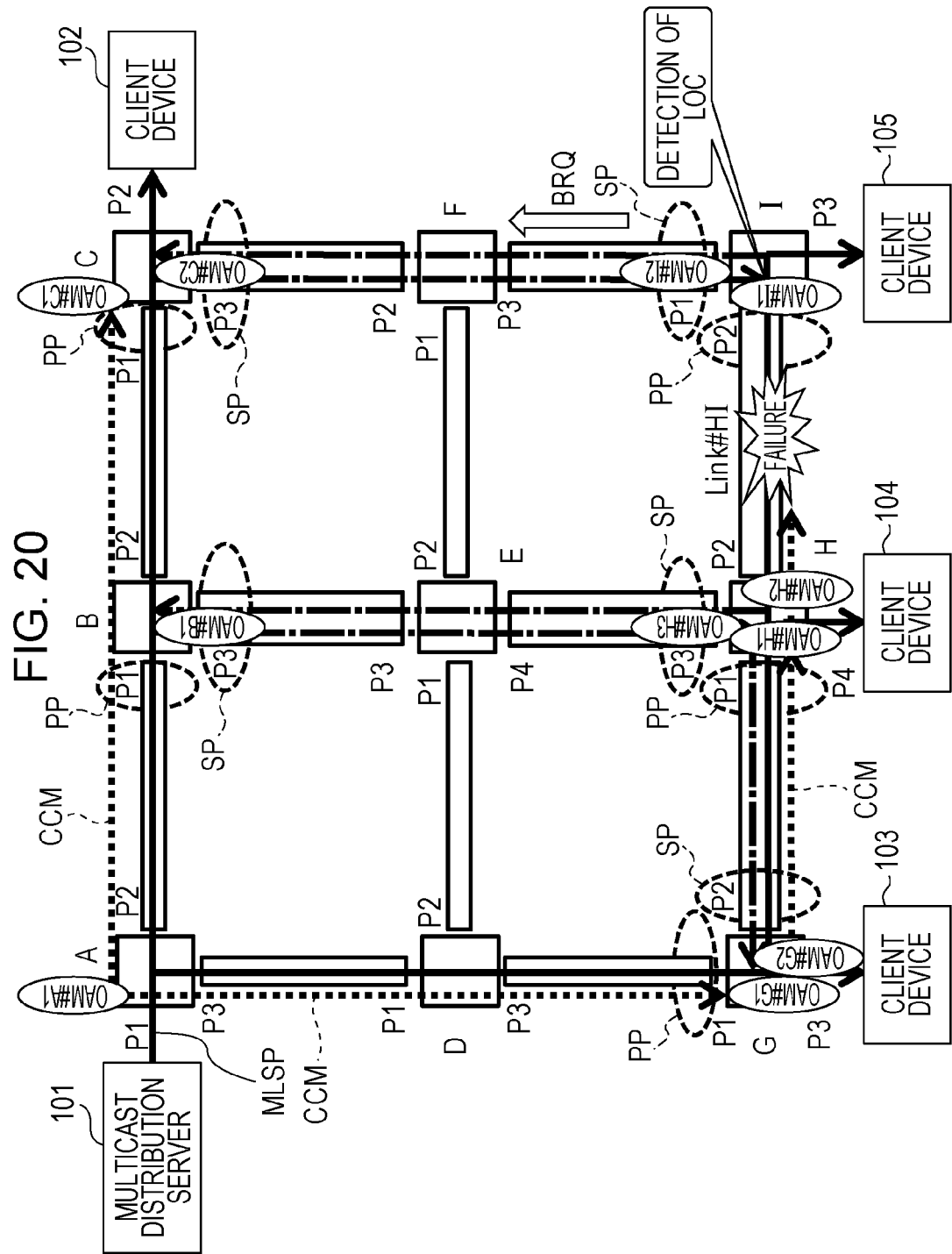
FIG. 20 is a diagram describing the failure recovery process that is executed by the system according to the embodiment.

Next, as illustrated in FIG. 20, for the node I that has detected the LOC of the primary path PP for the active multicast path MLSP, the OAM packet processor OAM#I2 for the secondary path SP transmits an OAM packet BRQ of a bridge request through the recovery branched path BP.

Figure 21:
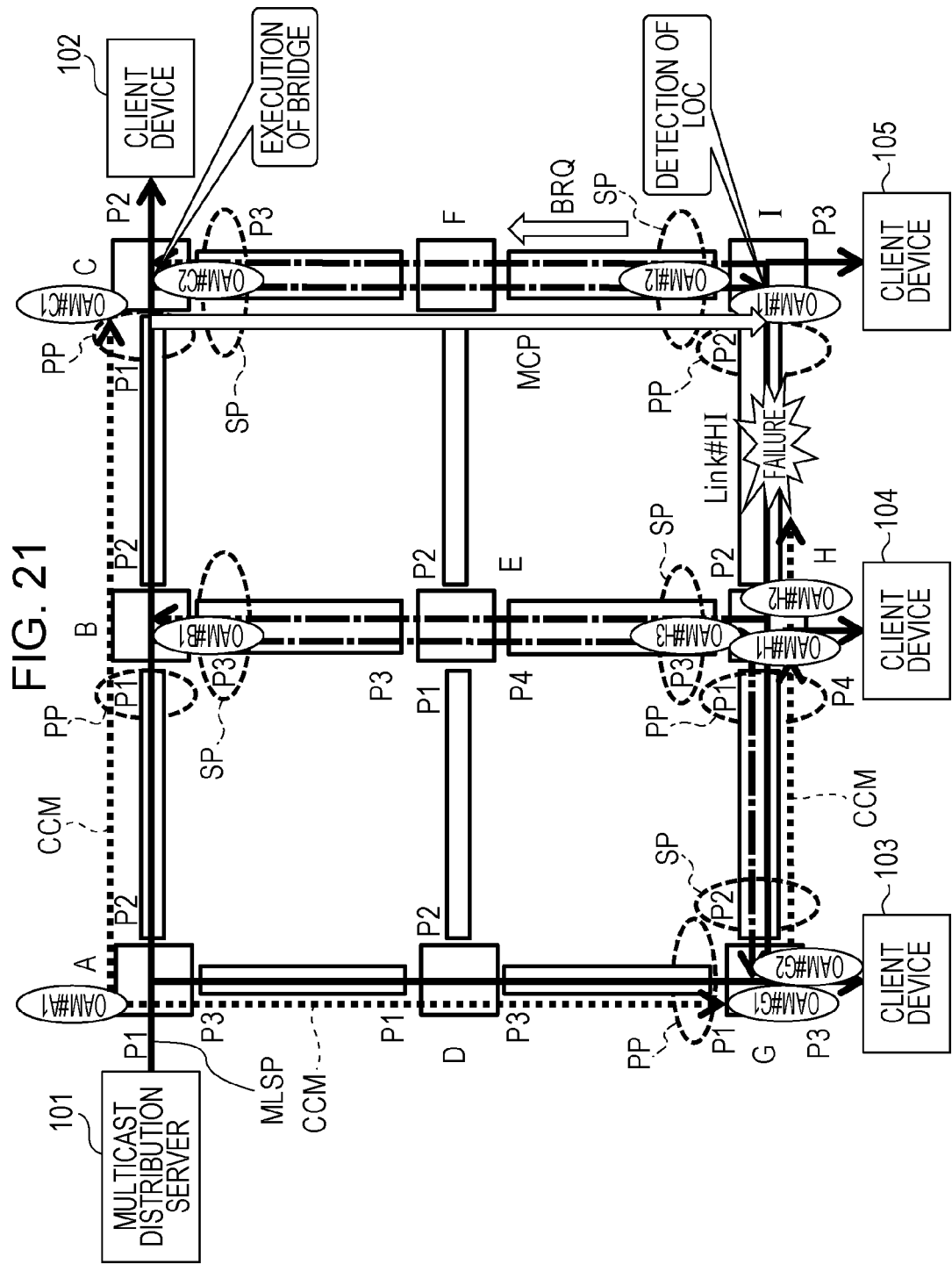
FIG. 21 is a diagram describing the failure recovery process that is executed by the system according to the embodiment.

As illustrated in FIG. 21, the node C that has received the OAM packet BRQ of the bridge request through the secondary path SP bridges a recovery MC packet of an interested active multicast path MLSP to the secondary path SP. The bridged recovery MC packet MCP reaches the secondary path SP of the node I through the recovery branched path BP extending through the node F and located between the nodes C and I on the links Link#CF and Link#FI. Thus, the active multicast path MLSP for the node I is recovered.

A third failure recovery process that is executed on the link Link#BC between the node B and the node C is described with reference to FIGS. 22, 23, and 24.

Figure 22:
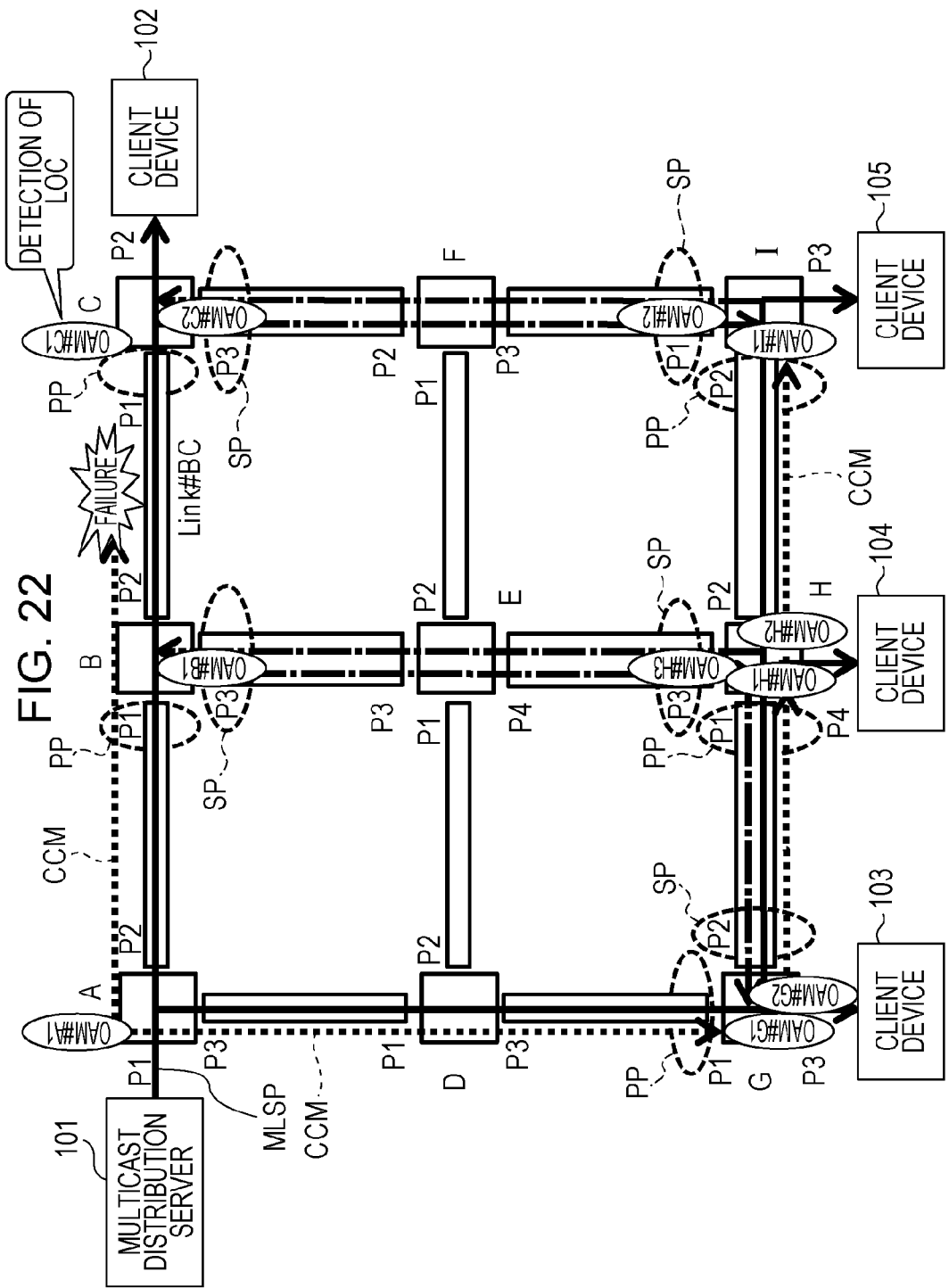
FIG. 22 is a diagram describing the failure recovery process that is executed by the system according to the embodiment.

FIG. 22 illustrates a state in which a failure occurs in the link Link#BC between the node B and the node C. The OAM packet processor OAM#C1 of the node C does not periodically receive an OAM packet CCM from the OAM packet processor OAM#A1 of the node A through the interested active multicast paths MLSP due to the failure of the link Link#BC and thereby detects an LOC.

Figure 23:
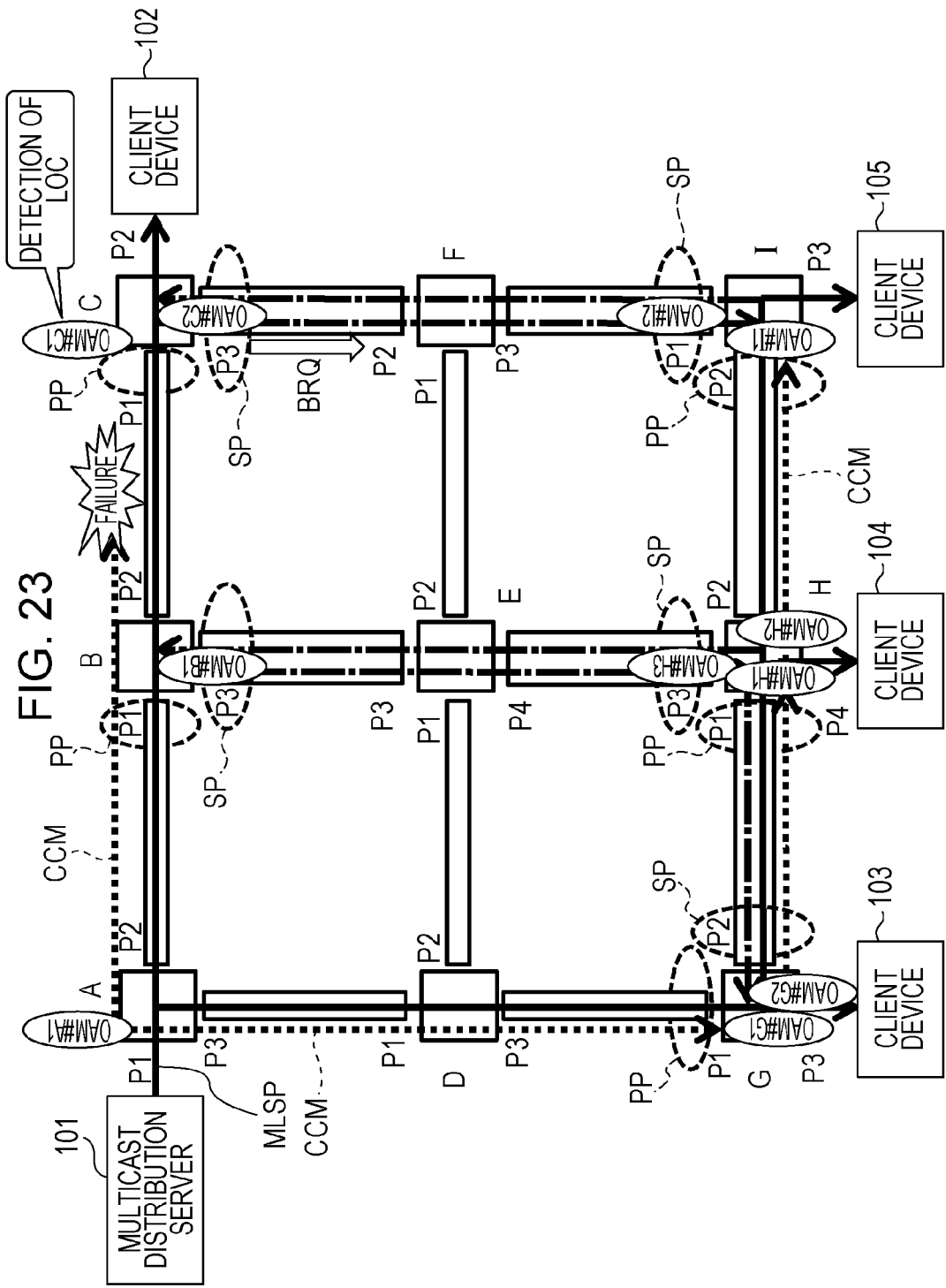
FIG. 23 is a diagram describing the failure recovery process that is executed by the system according to the embodiment.

Next, as illustrated in FIG. 23, for the node C that has detected the LOC of the primary path PP for the active multicast path MLSP, the OAM packet processor OAM#C2 for the secondary path SP transmits an OAM packet BRQ of a bridge request through the recovery branched path BP.

Figure 24:
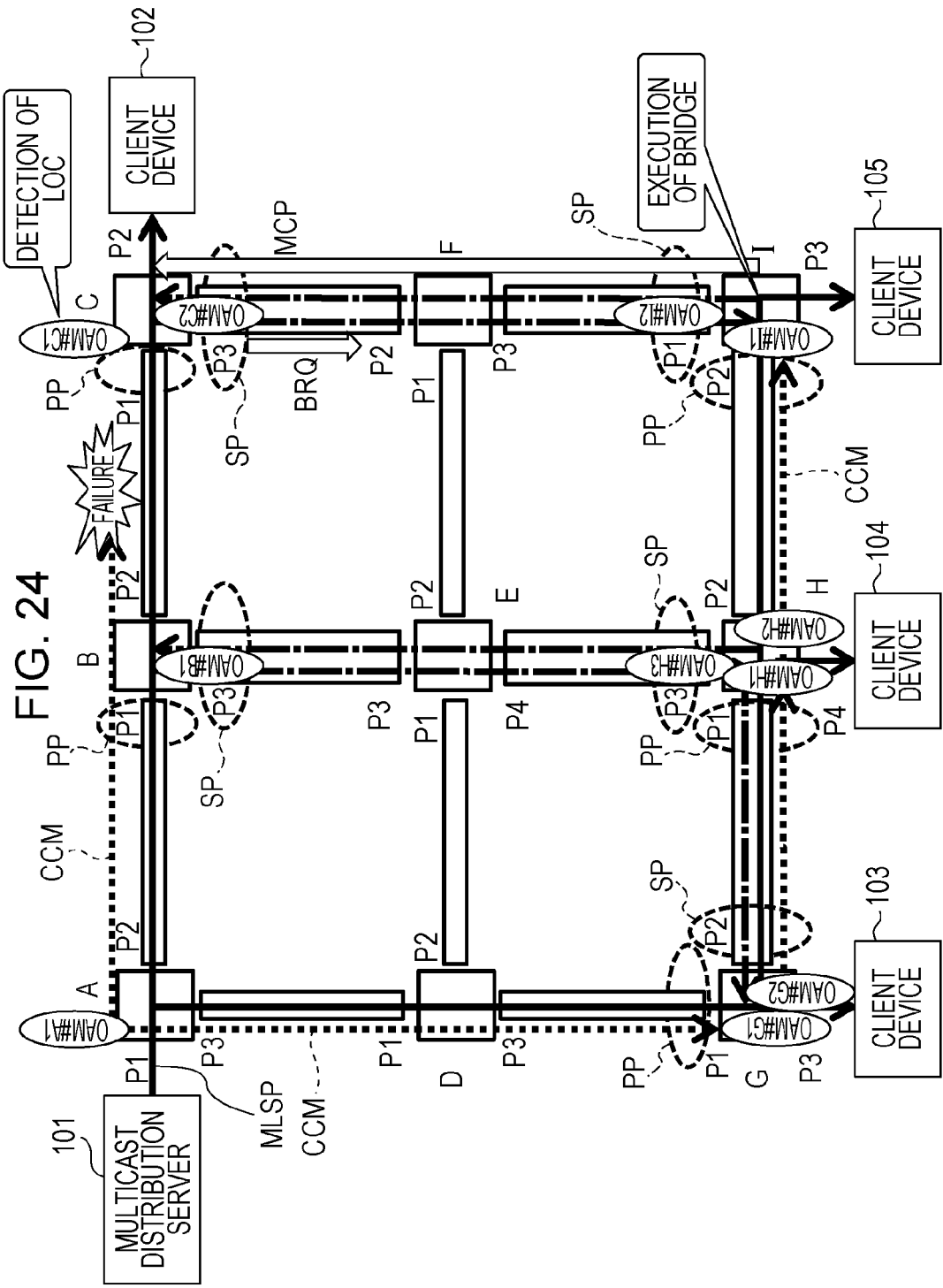
FIG. 24 is a diagram describing the failure recovery process that is executed by the system according to the embodiment.

As illustrated in FIG. 24, the node I that has received the OAM packet BRQ of the bridge request through the secondary path SP bridges a recovery MC packet of the active multicast path MLSP to the secondary path SP. The bridged recovery MC packet MCP reaches the secondary path SP of the node C through the recovery branched path BP extending through the node F and located between the nodes C and I on the link Link#CF and the link Link#FI. Thus, the active multicast path MLSP for the node C is recovered.

The first failure recovery process is described in detail below as an example. While the link Link#DG is in the failure state as illustrated in FIGS. 15 to 18, the OAM packet processors 14 of the nodes G, H, and B operate as follows, for example.

The OAM packet processor OAM#G1 executes the following process on the primary port P1 of the node G (refer to FIGS. 11A and 11B).

In G41, the OAM packet processor OAM#G1 changes the LOC state flag from LOC_State=N (communicating state) to LOC_State=Y (non-communicating state) in the LOC detection process, since the OAM packet processor OAM#G1 does not periodically receive an OAM packet CCM from the OAM packet processor OAM#A1 of the node A.

In G42, the OAM packet processor OAM#G1 maintains BG_RQ=N (bridge request's absent state) of the bridge request state flag for the primary port in the bridge request detection process, since the OAM packet processor OAM#A1 does not transmit an OAM packet BRQ of a bridge request.

In G43, the OAM packet processor OAM#G1 changes the state of the secondary path from Secondary=N (disable state) to Secondary=Y (enable state), since the LOC state flag indicates LOC_State=Y (non-communicating state) in the switching determination process. In addition, the OAM packet processor OAM#G1 maintains S_to_P=N (disable state) of the switching from the secondary path SP to the primary path PP and changes the bridge request state flag for the secondary port from S_BG_RQ=N (bridge request's absent state) to S_BG_RQ=Y (bridge request's present state).

The OAM packet processor OAM#G2 executes the following process on the secondary port P2 of the node G (refer to FIG. 12).

In G51, the OAM packet processor OAM#G2 maintains BG_RQ=N (bridge request's absent state) of the bridge request state flag for the secondary port in the bridge request detection process, since the OAM packet processor OAM#H1 of the node H does not transmit an OAM packet BRQ of a bridge request.

In G52, the OAM packet processor OAM#G2 changes, on the basis of S_BG_RQ=Y (bridge request's present state) changed in the aforementioned G43, from the state in which a bridge request is not transmitted to a state in which a bridge request is transmitted in the bridge request transmission process.

In G53, the OAM packet processor OAM#G2 maintains P_to_S=N (disable state) of the switching from the primary path PP to the secondary path SP in the switching determination process on the basis of BG_RQ=N (bridge request's absent state) maintained in the aforementioned G42.

The OAM packet processor OAM#G2 executes the following process on the requirement information of the node G (refer to FIG. 10).

In G61, the OAM packet processor OAM#G2 validates, on the basis of Secondary=Y (enable state) indicating the state of the secondary path and changed in the aforementioned G43, the routing information on the node G in the label state or validates the input port P2, the input label gh, the output port P3, and the output label "-" (no information).

The OAM packet processor OAM#H1 executes the following process on the primary port P1 of the node H (refer to FIGS. 11A and 11B).

In H41, the OAM packet processor OAM#H1 maintains LOC_State=N (communicating state) of the LOC state flag in the LOC detection process, since the OAM packet processor OAM#H1 periodically receives an OAM packet CCM from the OAM packet processor OAM#G2.

In H42, the OAM packet processor OAM#H1 changes the bridge request state flag for the primary port from BG_RQ=N (bridge request's absent state) to BG_RQ=Y (bridge request's present state) in the bridge request detection process, since the OAM packet processor OAM#G2 transmits an OAM packet BRQ of a bridge request.

In H43, the OAM packet processor OAM#H1 changes the states of the secondary path SP, switching, and bridge request state flag to Secondary=Y (enable state), S_to_P=Y (enable state), and S_BG_RQ=Y (bridge request's present state), since LOC_State=N (communicating state) and BG_RQ=Y (bridge request's present state) are set in the switching determination process.

The OAM packet processor OAM#H3 executes the following process on the secondary port P3 of the node H (refer to FIG. 12).

In H51, the OAM packet processor OAM#H3 maintains BG_RQ=N (bridge request's absent state) in the bridge request detection process, since the OAM packet processor OAM#B1 does not transmit an OAM packet BRG of a bridge request.

In H52, the OAM packet processor OAM#H3 changes, on the basis of S_BG_RQ=Y (bridge request's present state) changed in the aforementioned H43, from the state in which a bridge request is not transmitted to a state in which a bridge request is transmitted in the bridge request transmission process.

In H53, the OAM packet processor OAM#H3 changes the state of the switching from P_to_S=N (disable state) to P_to_S=Y (enable state) in the switching determination process on the basis of BG_RQ=Y (bridge request's present state) changed in the aforementioned H42.

The OAM packet processor OAM#H3 executes the following process on the requirement information of the node H (refer to FIG. 10).

In H61, the OAM packet processor OAM#H3 validates the routing information on the node H in the label table on the basis of Secondary=Y (enable state) changed in the aforementioned H43 or validates the input port P3, the input label eh, the output port P2, and the output label hi and validates the input port P3, the input label eh, the output port P4, and the output label "-" (no information).

In H62, the OAM packet processor OAM#H3 validates the routing information on the node H in the label table on the basis of S_to_P=Y (enable state) changed in the aforementioned H43 or validates the input port P3, the input label eh, the output port P1, and the output label gh.

The OAM packet processor OAM#B1 does not execute the MEP process on the primary port P1 of the node B.

The OAM packet processor OAM#B1 executes the following process on the secondary port P3 of the node B (refer to FIG. 12).

In B51, the OAM packet processor OAM#B1 changes the state of the bridge request state flag from BG_RQ=N (bridge request's absent state) to BG_RQ=Y (bridge request's present state) in the bridge request detection process, since the OAM packet processor OAM#H3 transmits an OAM packet BRQ of a bridge request.

In B52, the OAM packet processor OAM#B1 maintains, on the basis of S_BG_RQ=N (bridge request's absent state) that is the initial value, the state in which a bridge request is not transmitted in the bridge request transmission process.

In B53, the OAM packet processor OAM#B1 changes the state of the switching from P_to_S=N (disable state) to P_to_S=Y (enable state) in the switching determination process on the basis of BG_RQ=Y (bridge request's present state) maintained in the aforementioned H51.

The OAM packet processor OAM#B1 executes the following process on the requirement information of the node B (refer to FIG. 10).

In B61, the OAM packet processor OAM#B1 validates the routing information on the node B in the label table on the basis of P_to_S=Y (enable state) changed in the aforementioned B53 or validates the input port P1, the input label ab, the output port P3, and the output label be.

As a result of the routing operations of the OAM packet processors OAM#G2, OAM#H3, and the OAM#B1, the failure of the link Link#DG is recovered.

Another Embodiment

Another embodiment pays attention to and describes differences from the MPLS-TP network system SYS2 according to the aforementioned embodiment, as long as the description is clear.

Outline of System

Figure 25:
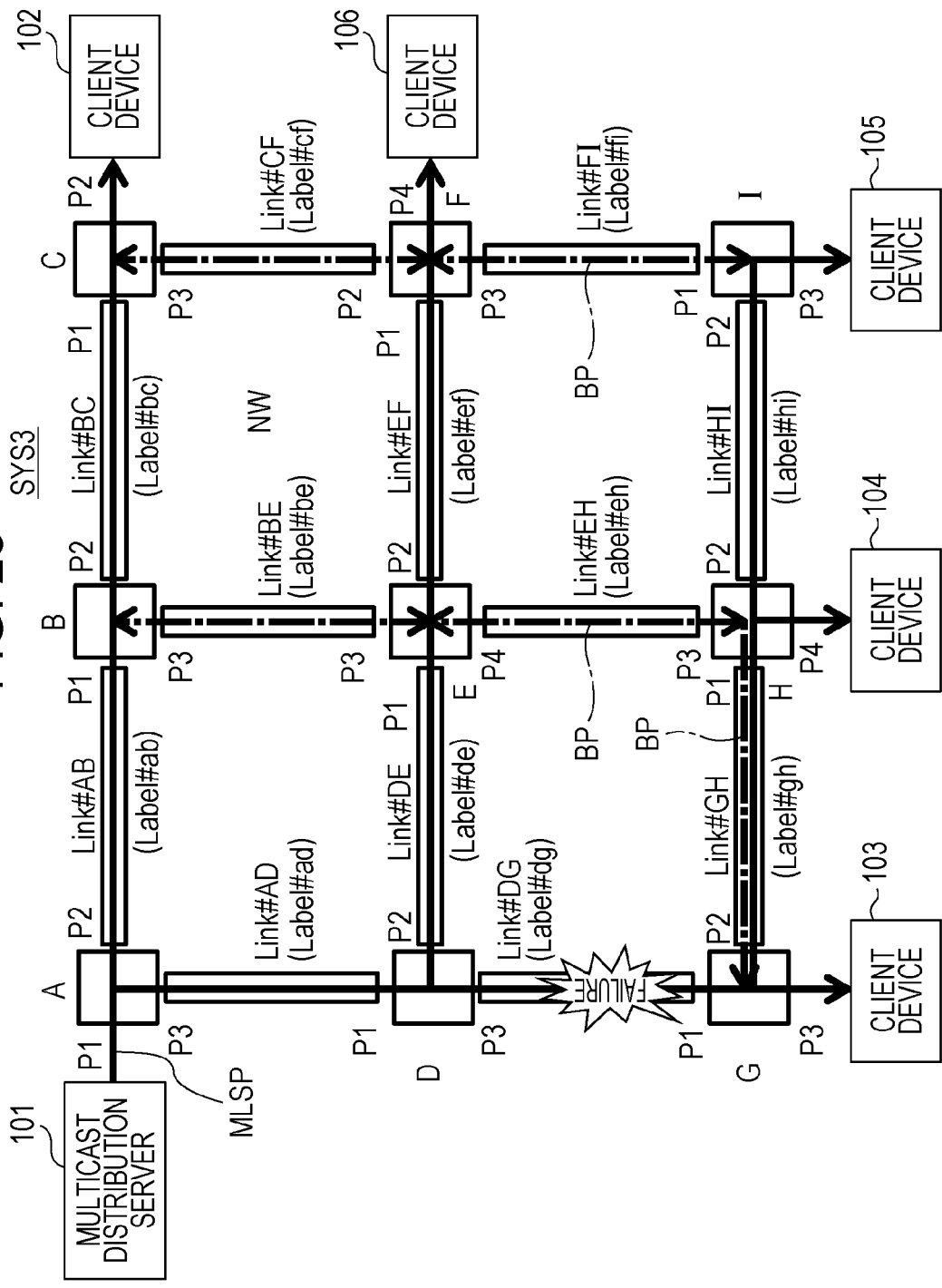
FIG. 25 is a block diagram illustrating an outline configuration of an MPLS-TP network system according to another embodiment.

Referring to FIG. 25 illustrating an outline configuration of an MPLS-TP network system according to the other embodiment, the MPLS-TP network system SYS3 includes a plurality (nine in this example) of nodes A to I that each have interface ports P1 to P3 or P1 to P4.

The nodes A to I are connected to each other in a mesh form by links Link#AB to Link#HI connecting interface ports P1 to P3 or P1 to P4 of each of the nodes A to I and thereby form a mesh network NW.

The nodes A to I set MPLS-TP label switched paths (LSPs) in advance in accordance with an instruction provided from the network management system NMS through the data communication network DCN (not illustrated).

A multicast distribution server 101 is connected to a plurality (five in this example) of clients 102, 103, 104, 105, and 106 by active multicast paths MLSP. The client 106 is added as a target client to which content data is distributed.

The nodes A to I each have a label table storing routing information (described later) and the like and transfer a multicast packet in accordance with the routing information. For example, the node D sets a label (output label) de to a multicast packet to be transferred to the node E from the interface port (output port) P2 of the node D, and the node E sets a label (output label) of to a multicast packet to be transferred to the node F from the interface port (output port) P2 of the node E (refer to FIG. 28).

As illustrated in FIG. 25, in the MPLS-TP network system SYS3, if an active multicast path MLSP set in a first direction fails, the failure is recovered using a logical recovery branched path related to a neighboring node (for example, node E) having an active multicast path MLSP set in a third direction in the same manner as a node (for example, node G) for handling a failure. The active multicast paths MLSP and the recovery branched path BP are connection-oriented paths.

Details of System

Figure 26:
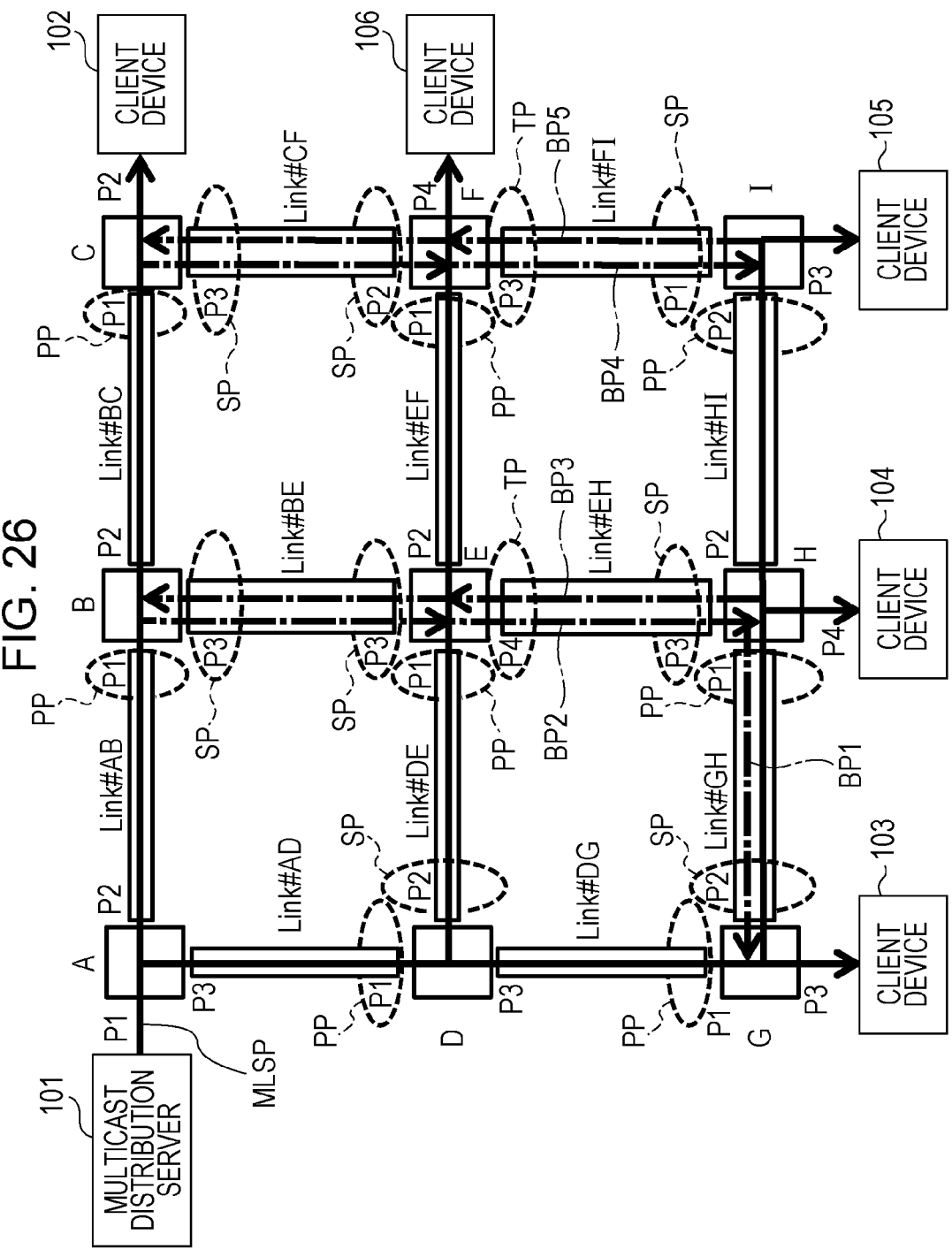
FIG. 26 is a block diagram illustrating a detailed configuration of the MPLS-TP network system according to the other embodiment.

Referring to FIG. 26 illustrating a detailed configuration of the system according to the other embodiment, primary paths PP of the nodes C, G, H, I, and F connected to the clients 102 to 106 are reception paths of the active multicast paths MLSP in the MPLS-TP network system SYS3.

In the MLSP-TP network system SYS3, in order to recover a failure of an active multicast path MLSP, the nodes E and F each have a primary path PP, a secondary path SP, and a third path TP for recovering the nodes G, H, and I.

For the link Link#GH, a recovery branched path BP1 that extends from the node H to the node G is a secondary path SP that is used when the node G does not receive a multicast packet (MC packet) from the primary path PP of the node G.

A recovery branched path BP2 that extends from the node B through the node E to the node H in the links Link#BE and Link#EH is a secondary path SP that is used when the node H does not receive an MC packet from the primary path PP of the node H.

A recovery branched path BP3 that extends from the node H through the node E to the node B in the links Link#BE and Link#EH is a secondary path SP that is used when the node B does not receive an MC packet from the primary path PP of the node B.

A recovery branched path BP4 that extends from the node C through the node F to the node I in the links Link#CF and Link#FI is a secondary path SP that is used when the node I does not receive an MC packet from the primary path PP of the node I.

A recovery branched path BP5 that extends from the node I through the node F to the node C in the links Link#CF and Link#FI is a secondary path SP that is used when the node C does not receive an MC packet from the primary path PP of the node C.

The secondary paths SP of the nodes B, C, E, F, G, H, and I and the third paths TP of the nodes E and F are each a path that receives an MC packet from a recovery branched path upon a failure of an active multicast path MLSP corresponding to an interested node and transmits an MC packet through the recovery branched path BP upon a failure of an active multicast path MLSP corresponding to a node other than the interested node.

The primary path PP of the node B is a reception path of an active multicast path MLSP for the secondary path SP of the node B.

Figure 27:
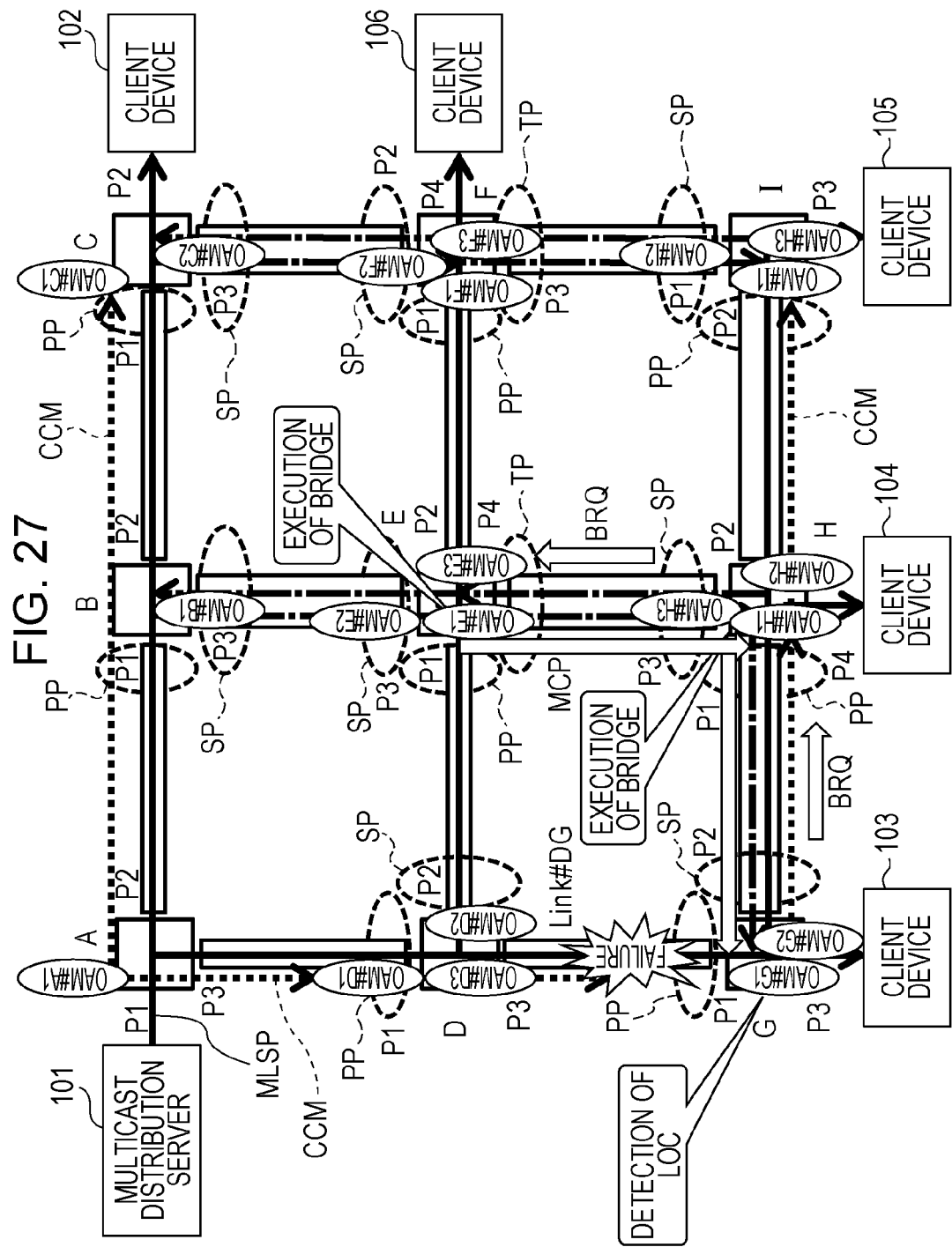
FIG. 27 is a diagram describing a failure recovery process that is executed by the system according to the other embodiment.

The starting-point node A of the active multicast paths MLSP illustrated in FIG. 26, the nodes B, C, D, G, H, and I each having a primary path PP and a secondary path SP, and the nodes E and F each having a primary path PP, a secondary path SP, and a third path TP, each have an OAM packet processor OAM, as illustrated in FIG. 27.

An OAM packet processor OAM#A1 of the starting-point node A of the active multicast paths MLSP periodically transmits a continuity check message for path monitoring as an OAM packet CCM to the active multicast paths MLSP.

While the nodes G and H are among the nodes C, G, H, I, and F connected to the clients 102 to 106 and each relay an active multicast path MLSP to another node, OAM packet processors OAM#G2 and OAM#H2 of the nodes G and H each periodically transmit an OAM packet CCM to a relay destination node.

OAM packet processors OAM#C1, OAM#G1, OAM#H1, OAM#I1, and OAM#F1 of the nodes C, G, H, I, and F connected to the clients 102 to 106 each monitor reception of an OAM packet CCM of an active multicast path MLSP through the primary port of the node. If any of the OAM packet processors OAM#C1, OAM#G1, OAM#H1, OAM#I1, and OAM#F1 does not receive an OAM packet CCM of an interested active multicast path MLSP within a predetermined time interval selectable on the basis of an operation, the OAM packet processor detects a failure state (LOC) of the active multicast path MLSP.

OAM packet processors OAM#B1, OAM#C2, OAM#E2, OAM#E3, OAM#F2, OAM#F3, OAM#G2, OAM#H3, and OAM#I2 of the nodes B, C, E, F, G, H, and I transmit and receive an OAM packet BRQ of a bridge request through the secondary paths SP.

The MPLS-TP network system SYS3 according to the other embodiment further includes a node that is configured to relay or terminate a third active multicast path MLSP set in an interested physical link and branched in the third direction from a first active multicast path MLSP set in the first direction or a second active multicast path set in a second direction.

When the node, which periodically receives, through a primary port, an OAM packet CCM transferred in the third active multicast path MLSP set in the third direction and is configured to relay or terminate the third active multicast path MLSP, receives an OAM packet BRQ of a bridge request through a third port, the node receives, through the primary port, a multicast packet transferred in the third active multicast path MLSP set in the third direction and bridges the received multicast packet to a recovery branched path BP set in the interested physical link.

It is, therefore, possible to reduce a wasteful band upon recovery from a failure and suppress the number of path links used upon the recovery from the failure.

Nodes

A configuration and functions of a node 10 included in the MPLS-TP network system SYS3 according to the other embodiment are the same as the node 10 included in the MPLS-TP network system SYS2 according to the embodiment, except for a label table (described later) stored in a label table storage unit LTB and an OAM packet processor 14 (described later).

Label Table

As illustrated in FIG. 28, nodes, routing information, path type information, and requirement information are associated with each other and stored in the label table within the label table storage unit LTB of the node 10 according to the other embodiment.

The routing information includes input port numbers, input labels, output port numbers, and output labels. In the path type information, Primary, Secondary, P_to_S, P_to_T, and S_to_P indicate a primary path PP, a secondary path SP, switching from a primary path PP to a secondary path SP, switching from a primary path PP to a third path TP, and switching from a secondary path SP to a primary path PP, respectively The nodes, the routing information, the path type information, and the requirement information (items and initial values) are information that is statically set by the label table processor 12 in accordance with an instruction provided by the device manager 11 according to an operation of an OAM operator (network operator) of the network management system NMS.

The requirement information includes valid requirements for the routing information and invalid requirements for the routing information. In the valid requirements for the routing information, Secondary=Y, P_to_S=Y, P_to_T=Y, and S_to_P=Y indicate an enable state of a secondary path SP, an enable state of switching from a primary path PP to a secondary path SP, an enable state of switching from a primary path PP to a third path TP, and an enable state of switching from a secondary path SP to a primary path PP, respectively. The routing information indicates that normal states of primary paths PP do not depend on the valid and invalid requirements.

In the invalid requirements for the routing information, Secondary=N, P_to_S=N, P_to_T=N, and S_to_P=N indicate a disable state of a secondary path SP, a disable state of switching from a primary path PP to a secondary path SP, a disable state of switching from a primary path PP to a third path TP, and a disable state of switching from a secondary path SP to a primary path PP, respectively. The routing information indicates that the normal states of the primary paths PP do not depend on the valid and invalid requirements.

Set values of the requirement information are information that is dynamically set by the label table processor 12 in accordance with an instruction from the OAM packet processor 14. Specifically, the values of the requirement information are set by the label table processor 12 in response to the execution of a process (described later) by the OAM packet processor 14.

OAM Packet Processors

Figure 29:
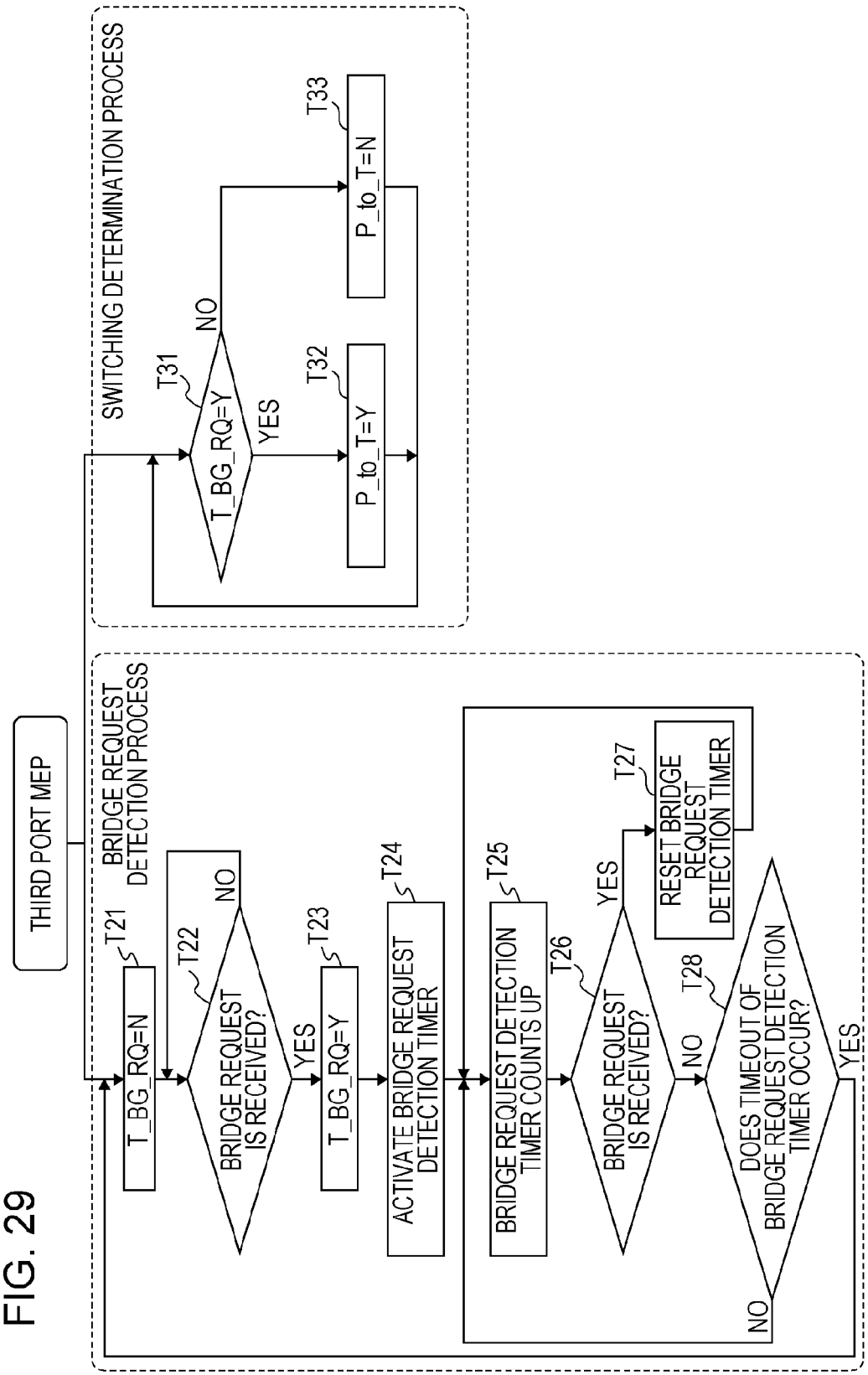
FIG. 29 is a flowchart of a process that is executed by an OAM packet processor of the node according to the other embodiment.

FIG. 29 describes the process that is executed on each of the third ports of the nodes E and F by each of the OAM packet processors 14 of the nodes E and F.

In a bridge request detection process, the OAM packet processor 14 monitors, through the third port, reception of a bridge request. If a bridge request is received, the OAM packet processor 14 notifies a switching determination process of T_BG_RQ=Y or a bridge request's present state for the third port. If the bridge request is received and another bridge request is not received within a predetermined time period, the OAM packet processor 14 notifies the switching determination process of T_BG_RQ=N or a bridge request's absent state for the third port.

Specifically, the bridge request detection process is executed in accordance with the following procedure. In T21 indicating T_BG_RQ=N, the bridge request state flag for the third port is initially set to the bridge request's absent state.

In T22 indicating a determination about reception of a bridge request, whether or not an OAM packet BRQ of the bridge request has been received is determined. If the answer to T22 is negative, the OAM packet processor 14 waits until the OAM packet BRQ of the bridge request is received.

If the answer to T22 is positive, the bridge request state flag for the third port is set to the bridge request's present state in T23 indicating T_BG_RQ=Y and the OAM packet processor 14 notifies the switching determination process of the bridge request's present state.

In T24, a bridge request detection timer is activated. In T25, the bridge request detection timer counts up.

In T26 indicating a determination about reception of a bridge request, whether or not an OAM packet BRQ of the bridge request has been received is determined.

If the answer to T26 is positive, the bridge request detection timer is reset in T27 and the process returns to T25.

If the answer to T26 is negative, whether or not a timeout of the bridge request detection timer has occurred is determined in T28. If the answer to T28 is negative, the process returns to T25. If the answer to T28 is positive, the process returns to T21.

In the switching determination process, a valid requirement for the routing information and an invalid requirement for the routing information that correspond to P_to_T (switching from the primary path PP to the third path TP) of the path type information is determined in accordance with T_BG_RQ=Y (bridge request's present state) notified in the bridge request detection process. In addition, the OAM packet processor 14 instructs the label table processor 12 to set the requirement information of the label table.

Specifically, the switching determination process is executed in accordance with the following procedure. In T31 indicating a determination about T_BG_RQ=Y, whether or not the bridge request state flag for the third port indicates the bridge request's present state is determined.

If the answer to T31 is positive, the switching from the primary path PP to the third path TP is set to the enable state in T32 indicating P_to_T=Y.

If the answer to T31 is negative, the switching from the primary path PP to the third path TP is set to the disable state in T33 indicating P_to_T=N.

Failure Recovery Process

Next, an example of a failure recovery process that is executed by the MPLS-TP network system SYS3 according to the other embodiment is described with reference to related drawings.

Normal State

Referring to FIGS. 26 and 27, in the MPLS-TP network system SYS3 that is in a normal state, OAM packet processors OAM#A1, OAM#D2, OAM#D3, OAM#E3, OAM#G2, and OAM#H2 of the nodes A, D, E, G, and H each transmit an OAM packet CCM on the active multicast paths MLSP. OAM packet processors OAM#C1, OAM#F1, OAM#G1, OAM#H1, and OAM#I1 of the nodes C, F, G, H, and I each receive an OAM packet CCM periodically (at predetermined time intervals) and determine that the MPLS-TP network system SYS3 is in the normal state.

Specifically, in the normal state, OAM packet processors 14 (reference numeral 14 is used when the OAM packet processors are not specified) of the nodes G, H, and E operate as follows, for example.

In each of the nodes G, H, and E, initial values of the following parameters are N. (1) LOC_State=N (an LOC state flag indicates the normal state or a communicating state), (2) BG_RQ=N (a bridge request state flag for the primary or secondary port indicates the bridge request's absent state), (3) S_BG_RQ=N (the bridge request state flag for the secondary port indicates the bridge request's absent state), (4) Secondary=N (the secondary port SP is in the disable state), (5) S_to_P=N (the switching from the secondary path SP to the primary path PP is in the disable state), (6) P_to_S=N (the switching from the primary path PP to the secondary path SP is in the disable state), (7) T_BG_RQ=N (the bridge request state flag for the third path TP indicates the bridge request's absent state), (8) P_to_T=N (the switching from the primary path PP to the third path TP is in the disable state). The OAM packet processor OAM#G1 executes the following process on the primary path P1 of the node G (refer to FIGS. 11A and 11B).

In G71, the OAM packet processor OAM#G1 maintains LOC_State=N (communicating state) of the LOC state flag in an LOC detection process, since the OAM packet processor OAM#G1 periodically receives an OAM packet CCM from the OAM packet processor OAM#D3 of the node D.

In G72, the OAM packet processor OAM#G1 maintains BG_RQ=N (bridge request's absent state) of the bridge request state flag for the primary port in the bridge request detection process, since the OAM packet processor OAM#D3 does not transmit a bridge request.

In G73, the OAM packet processor OAM#G1 maintains Secondary=N (disable state) indicating the state of the secondary path, S_to_P_N (disable state) of the switching from the secondary path SP to the primary path PP, and S_BG_RQ=N (invalid state) of the bridge request state flag for the secondary port, since LOC_State=N (communicating state) and BG_RQ=N (bridge request's absent state) are set in the switching determination process.

The OAM packet processor OAM#G2 executes the following process on the primary port P2 of the node G (refer to FIG. 12).

In G81, the OAM packet processor OAM#G2 maintains BG_RQ=N (bridge request's absent state) in the bridge request detection process, since the OAM packet processor OAM#H1 of the node H does not transmit a bridge request.

In G82, the OAM packet processor OAM#G2 maintains, on the basis of S_BG_RQ=N (bridge request's absent state) maintained in the aforementioned G73, a state in which a bridge request is not transmitted in the bridge request transmission process.

In G83, the OAM packet processor OAM#G2 maintains P_to_S=N (disable state) in the switching determination process on the basis of BG_RQ=N (bridge request's absent state) maintained in the aforementioned G72.

The OAM packet processor OAM#G2 executes the following process on requirement information of the node G (refer to FIG. 28).

In G91, the OAM packet processor OAM#G2 maintains routing information on the node G in the label state on the basis of Secondary=N (disable state) maintained in the aforementioned G73 or maintains invalid states of an input port P2, input label gh, output port P3, and output label "-" (no information).

The OAM packet processor OAM#H1 executes the following process on the primary port P1 of the node H (refer to FIGS. 11A and 11B).

In H71, the OAM packet processor OAM#H1 maintains LOC_State=N (communicating state) in the LOC detection process, since the OAM packet processor OAM#H1 periodically receives an OAM packet CCM from the OAM packet processor OAM#G2.

In H72, the OAM packet processor OAM#H1 maintains BG_RQ=N (bridge request's absent state) in the bridge request detection process, since the OAM packet processor OAM#G2 does not transmit an OAM packet BRQ of a bridge request.

In H73, the OAM packet processor OAM#H1 maintains Secondary=N (disable state), S_to_P=N (disable state), and S_BG_RQ=N (bridge request's absent state), since LOC_State=N (communicating state) and BG_RQ=N (bridge request's absent state) are set in the switching determination process.

The OAM packet processor OAM#H3 executes the following process on the secondary port P3 of the node H (refer to FIG. 12).

In H81, the OAM packet processor OAM#H3 maintains BG_RQ=N (bridge request's absent state) in the bridge request detection process, since the OAM packet processor OAM#E3 does not transmit an OAM packet BRQ of a bridge request.

In H82, the OAM packet processor OAM#H3 maintains, on the basis of S_BG_RQ=N (bridge request's absent state) maintained in the aforementioned H73, a state in which a bridge request is not transmitted in the bridge request transmission process.

In H83, the OAM packet processor OAM#H3 maintains P_to_S=N (disable state) in the switching determination process on the basis of BG_RQ=N (bridge request's absent state) maintained in the aforementioned H72.

The OAM packet processor OAM#H3 executes the following process on requirement information of the node H (refer to FIG. 28).

In H91, the OAM packet processor OAM#H3 maintains routing information on the node H in the label table on the basis of Secondary=N (disable state) maintained in the aforementioned H73 or maintains invalid states of an input port P3, input label eh, output port P2 and output label hi and invalid states of the input port P3, input label eh, output port P4, and output label "-" (no information).

In H92, the OAM packet processor OAM#H3 maintains routing information on the node H in the label state on the basis of S_to_P=N (disable state) maintained in the aforementioned H73 or maintains invalid states of the input port P3, input label eh, output port P1, and output label gh.

The OAM packet processor OAM#E1 executes the following process on the primary port P1 of the node E (refer to FIGS. 11A and 11B).

In E71, the OAM packet processor OAM#E1 maintains LOC_State=N (communicating state) in the LOC detection process, since the OAM packet processor OAM#E1 periodically receives an OAM packet CCM from the OAM packet processor OAM#D2.

In E72, the OAM packet processor OAM#E1 maintains BG_RQ=N (bridge request's absent state) in the bridge request detection process, since the OAM packet processor OAM#D2 does not transmit an OAM packet BRQ of a bridge request.

In E73, the OAM packet processor OAM#E1 maintains Secondary=N (disable state), S_to_P=N (disable state), and BG_RQ=N (bridge request's absent state), since LOC_State=N (communicating state) and BG_RQ=N (bridge request's absent state) are set in the switching determination process.

The OAM packet processor OAM#E2 executes the following process on the secondary port P3 of the node E (refer to FIG. 12).

In E81, the OAM packet processor OAM#E2 maintains BG_RQ=N (bridge request's absent state) in the bridge request detection process, since the OAM packet processor OAM#B1 does not transmit an OAM packet BRQ of a bridge request.

In E82, the OAM packet processor OAM#E2 maintains, on the basis of BG_RQ=N (bridge request's absent state), a state in which a bridge request is not transmitted in the bridge request transmission process.

In E83, the OAM packet processor OAM#E2 maintains P_to_S=N (disable state) in the switching determination process on the basis of BG_RQ=N (bridge request's absent state) maintained in the aforementioned E82.

The OAM packet processor OAM#E3 executes the following process on the third port P4 of the node E (refer to FIG. 29).

In E91, the OAM packet processor OAM#E3 maintains T_BG=RQ=N (bridge request's absent state) of the bridge request state flag for the third port in the bridge request detection process, since the OAM packet processor OAM#H3 does not transmit an OAM packet BRQ of a bridge request.

In E92, the OAM packet processor OAM#E3 maintains P_to_T=N (disable state) of switching from the primary path PP to the third port TP in the switching determination process on the basis of T_BG_RQ=N (bridge request's absent state) maintained in the aforementioned E91.

The OAM packet processor OAM#E3 executes the following process on requirement information of the node E (refer to FIG. 28).

In E101, the OAM packet processor OAM#E3 maintains routing information on the node E in the label table on the basis of Secondary=N (disable state) maintained in the aforementioned E73 or maintains invalid states of an input port P3, input label be, output port P2, and output label ef.

In E102, the OAM packet processor OAM#E3 maintains routing information on the node E in the label table on the basis of P_to_S=N (disable state) maintained in the aforementioned E83 or maintains invalid states of an input port P1, input label de, output port P3, and output label be.

In E103, the OAM packet processor OAM#E3 maintains the routing information on the node E in the label table on the basis of P_to_T=N (disable state) maintained in the aforementioned E92 or maintains invalid states of the input port P1, input label de, output port P4, and output label eh.

Failure State

Referring to FIG. 27, an example of a failure recovery process that is executed on the link Link#DG between the node D and the node G is described below.

FIG. 27 illustrates a state in which a failure occurs in the link Link#DG between the node D and the node G. The OAM packet processor OAM#G1 of the node G does not periodically receive an OAM packet CCM for path monitoring through an interested active multicast path MLSP from the OAM packet processor OAM#D3 of the node D due to the failure of the link Link#DG and thereby detects an LOC (failure state).

Next, for the node G that has detected the LOC of the primary path PP for the active multicast path MLSP, the OAM packet processor OAM#G2 for the secondary path SP transmits an OAM packet BRQ of a bridge request through an interested active multicast path MLSP.

For the node H that has received the OAM packet BRQ of the bridge request through the primary path PP, the OAM packet processor OAM#H3 for the secondary path SP transmits an OAM packet BRQ of a bridge request through a recovery branched path BP.

In addition, the node E that has received the OAM packet BRQ of the bridge request through the third path TP bridges a recovery MC packet of an interested active multicast path MLSP to the third path TP. The recovery MC packet MCP bridged by the node E reaches the secondary path SP of the node H through the recovery branched path BP between the nodes E and H on the link Link#EH. The OAM packet processor OAM#H3 bridges the recovery MC packet of the secondary path SP to the primary path PP that has received the OAM packet BRQ of the bridge request.

Thus, the active multicast path MLSP for the node G is recovered and active multicast paths MLSP for the nodes H and I are recovered.

Specifically, in the state (illustrated in FIG. 27) in which the failure occurs in the link Link#DG, the OAM packet processors 14 of the nodes G, H, and E operate as follows, for example.

The OAM packet processor OAM#G1 executes the following process on the primary port P1 of the node G (refer to FIGS. 11A and 11B).

In G111, the OAM packet processor OAM#G1 changes the LOC state flag from LOC_State=N (communicating state) to LOC_State=Y (non-communicating state) in the LOC detection process, since the OAM packet processor OAM#G1 does not periodically receive an OAM packet CCM from the OAM packet processor OAM#D3 of the node D.

In G112, the OAM packet processor OAM#G1 maintains BG_RQ=N (bridge request's absent state) of the bridge request state flag for the primary port in the bridge request detection process, since the OAM packet processor OAM#D3 does not transmit an OAM packet BRQ of a bridge request.

In G113, the OAM packet processor OAM#G1 changes the state of the secondary path from Secondary=N (disable state) to Secondary=Y (enable state), since the LOC state flag indicates LOC_State=Y (non-communicating state) in the switching determination process. In addition, the OAM packet processor OAM#G1 maintains S_to_P=N (disable state) of the switching from the secondary path SP to the primary path PP and changes the bridge request state flag for the secondary port from S_BG_RQ=N (bridge request's absent state) to S_BG_RQ=Y (bridge request's present state).

The OAM packet processor OAM#G2 executes the following process on the secondary port P2 of the node G (refer to FIG. 12).

In G121, the OAM packet processor OAM#G2 maintains BG_RQ=N (bridge request's absent state) of the bridge request state flag for the second port in the bridge request detection process, since the OAM packet processor OAM#H1 of the node H does not transmit an OAM packet BRQ of a bridge request.

In G122, the OAM packet processor OAM#G2 changes, on the basis of S_BG_RQ=Y (bridge request's present state) changed in the aforementioned G113, from the state in which a bridge request is not transmitted to a state in which a bridge request is transmitted in the bridge request transmission process.

In G123, the OAM packet processor OAM#G2 maintains P_to_S=N (disable state) of the switching from the primary path PP to the secondary path SP in the switching determination process on the basis of BG_RQ=N (bridge request's absent state) maintained in the aforementioned G112.

The OAM packet processor OAM#G2 executes the following process on the requirement information of the node G (refer to FIG. 28).

In G131, the OAM packet processor OAM#G2 validates the routing information on the node G in the label table on the basis of Secondary=Y (enable state) indicating the state of the secondary path and changed in the aforementioned G113 or validates the input port P2, the input label gh, the output port P3, and the output label "-" (no information).

The OAM packet processor OAM#H1 executes the following process on the primary port P1 of the node H (refer to FIGS. 11A and 11B).

In H111, the OAM packet processor OAM#H1 maintains LOC_State=N (communicating state) of the LOC state flag in the LOC detection process, since the OAM packet processor OAM#H1 periodically receives an OAM packet CCM from the OAM packet processor OAM#G2.

In H112, the OAM packet processor OAM#H1 changes the bridge request state flag for the primary port from BG_RQ=N (bridge request's absent state) to BG_RQ=Y (bridge request's present state) in the bridge request detection process, since the OAM packet processor OAM#G2 transmits an OAM packet BRQ of a bridge request.

In H113, the OAM packet processor OAM#H1 changes the states of the secondary path SP, switching, and bridge request state flag to Secondary=Y (enable state), S_to_P=Y (enable state), and S_BG_RQ=Y (bridge request's present state), since LOC_State=N (communicating state) and BG_RQ=Y (bridge request's present state) are set in the switching determination process.

The OAM packet processor OAM#H3 executes the following process on the secondary port P3 of the node H (refer to FIG. 12).

In H121, the OAM packet processor OAM#H3 maintains BG_RQ=N (bridge request's absent state) in the bridge request detection process, since the OAM packet processor OAM#E3 does not transmit an OAM packet BRQ of a bridge request.

In H122, the OAM packet processor OAM#H3 changes, on the basis of S_BG_RQ=Y (bridge request's present state) changed in the aforementioned H113, from the state in which a bridge request is not transmitted to a state in which a bridge request is transmitted in the bridge request transmission process.

In H123, the OAM packet processor OAM#H3 changes the state of the switching from P_to_S=N (disable state) to P_to_S=Y (enable state) in the switching determination process on the basis of BG_RQ=Y (bridge request's present state) changed in the aforementioned H112.

The OAM packet processor OAM#H3 executes the following process on the requirement information of the node H (refer to FIG. 28).

In H131, the OAM packet processor OAM#H3 validates the routing information on the node H in the label table on the basis of Secondary=Y (enable state) changed in the aforementioned H113 or validates the input port P3, the input label eh, the output port P2, and the output label hi and validates the input port P3, the input label eh, the output port P4, and the output label "-" (no information).

In H132, the OAM packet processor OAM#H3 validates the routing information on the node H in the label table on the basis of S_to_P=Y (enable state) changed in the aforementioned H113 or validates the input port P3, the input label eh, the output port P1, and the output label gh.

The OAM packet processor OAM#E1 executes the following process on the primary port P1 of the node E (refer to FIGS. 11A and 11B).

In E111, the OAM packet processor OAM#E1 maintains LOC_State=N (communicating state) in the LOC detection process, since the OAM packet processor OAM#E1 periodically receives an OAM packet CCM from the OAM packet processor OAM#D2.

In E112, the OAM packet processor OAM#E1 maintains BG_RQ=N (bridge request's absent state) in the bridge request detection process, since the OAM packet processor OAM#D2 does not transmit an OAM packet BRQ of a bridge request.

In E113, the OAM packet processor OAM#E1 maintains Secondary=N (disable state), S_to_P=N (disable state), and BG_RQ=N (bridge request's absent state), since LOC_State=N (communicating state) and BG_RQ=N (bridge request's absent state) are set in the switching determination process.

The OAM packet processor OAM#E2 executes the following process on the secondary port P3 of the node E (refer to FIG. 12).

In E121, the OAM packet processor OAM#E2 maintains BG_RQ=N (bridge request's absent state) in the bridge request detection process, since the OAM packet processor OAM#B1 does not transmit an OAM packet BRQ of a bridge request.

In E122, the OAM packet processor OAM#E2 maintains, on the basis of S_BG_RQ=N (bridge request's absent state), the state in which a bridge request is not transmitted in the bridge request transmission process.

In E123, the OAM packet processor OAM#E2 maintains P_to_S=N (disable state) in the switching determination process on the basis of BG_RQ=N (bridge request's absent state) maintained in the aforementioned E112.

The OAM packet processor OAM#E3 executes the following process on the third port P4 of the node E (refer to FIG. 29).

In E131, the OAM packet processor OAM#E3 changes the bridge request state flag for the third port from T_BG_RQ=N (bridge request's absent state) to T_BG_RQ=Y (bridge request's present state) in the bridge request detection process, since the OAM packet processor OAM#H3 transmits an OAM packet BRQ of a bridge request.

In E132, the OAM packet processor OAM#E3 changes the state of the switching from the primary port PP to the third port TP to P_to_T=Y (enable state) in the switching determination process on the basis of T_BG_RQ=Y (bridge request's present state) changed in the aforementioned E131.

The OAM packet processor OAM#E3 executes the following process on the requirement information of the node E (refer to FIG. 28).

In E141, the OAM packet processor OAM#E3 maintains the routing information on the node E in the label table on the basis of Secondary=N (disable state) maintained in the aforementioned E113 or maintains the invalid states of the input port P3, input label be, output port P2, and output label ef.

In E142, the OAM packet processor OAM#E3 maintains the routing information on the node E in the label table on the basis of P_to_S=N (disable state) maintained in the aforementioned E123 or maintains the invalid states of the input port P1, input label de, output port P3, and output label be.

In E143, the OAM packet processor OAM#E3 validates the routing information on the node E in the label table on the basis of P_to_T=Y (enable state) changed in the aforementioned E132 or validates the input port P1, the input label de, the output port P4, and the output label eh.

As a result of the routing operations of the OAM packet processors OAM#G2, OAM#H3, and OAM#E3, the failure of the link Link#DG is recovered.

Modified Example

The aforementioned processes according to the embodiments may be provided as a computer-executable program through a non-temporary computer-readable recording medium such as a CD-ROM or a flexible disk or through a communication line.

Any two or more or all of the processes according to the embodiments may be selected, combined, and executed.

The packet transport network systems disclosed herein may reduce a wasteful band upon recovery from a failure and suppress the number of path links used upon the recovery from the failure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet transport network system comprising:
a plurality of nodes connected to one another by a plurality of links to form a network, each of the nodes being configured to relay or terminate packets on first and second active multicast label switched paths (MLSPs) of an active MLSP set, the plurality of nodes including
a starting node configured to distribute a multicast packet and to branch the multicast packet in a first direction and a second direction different than the first direction,
a first node configured to receive the multicast packet from the starting node in the first direction when periodically receiving, from the starting node, continuity check packets through a primary port of the first node on the active MLSP set in the first direction, and transmit a control packet provided for a request for recovery through a secondary port of the first node, when the first node not receiving, through the primary port of the first node, continuity check packets provided for path monitoring and transmitted on the active MLSP set in the first direction, and
a second node, when the second node receives the control packet through a secondary port of the second node, configured to receive, through a primary port of the second node, the multicast packet transmitted on the active MLSP set in the second direction, and bridge the received multicast packet to a recovery MLSP set, the second node periodically receiving, through the primary port of the second node, continuity check packets transmitted on the active MLSP set in the second direction,
wherein the first node receives, through the secondary port of the first node, the multicast packet bridged to the recovery MLSP set.

2. The packet transport network system according to claim 1, further comprising:
a third node configured to relay or terminate packets on a third MLSP set, the third node transferring packets to be branched in a third direction from the active MLSP set in the first direction or in the second direction,
wherein when the third node receives the control packet through a third port, the third node receives, through a primary port of the third node, the multicast packet transmitted on the third MLSP set in the third direction and bridges the received multicast packet to a recovery path, the third node periodically receiving, through the primary port of the third node, the continuity check packet transmitted on the third MLSP set in the third direction.

3. The packet transport network system according to claim 1, wherein the network is a mesh network in which the plurality of nodes are connected to each other in a mesh form by the links.

4. The packet transport network system according to claim 2, wherein the network is a mesh network in which the plurality of nodes are connected to each other in a mesh form by the links.

5. The packet transport network system according to claim 1, wherein the continuity check packet and the control packet that indicates the request for recovery are multi protocol label switching-transport profile (MPLS-TP) operation administration and maintenance (OAM) packets.

6. The packet transport network system according to claim 2, wherein the continuity check packet and the control packet that indicates the request for recovery are multi protocol label switching-transport profile (MPLS-TP) operation administration and maintenance (OAM) packets.

7. The packet transport network system according to claim 2, wherein the active MLSP set and the recovery MLSP set comprise logical paths in which connections are established.

* * * * *